US008553025B2

(12) United States Patent
Furukawa et al.

(10) Patent No.: US 8,553,025 B2
(45) Date of Patent: Oct. 8, 2013

(54) PLASMA DISPLAY APPARATUS WITH POWER RECOVERY CIRCUIT

(75) Inventors: Isao Furukawa, Mito (JP); Yasunobu Hashimoto, Kawasaki (JP); Koichi Sakita, Chigasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 85 days.

(21) Appl. No.: 12/863,621

(22) PCT Filed: Sep. 10, 2008

(86) PCT No.: PCT/JP2008/066359

§ 371 (c)(1), (2), (4) Date: Jul. 20, 2010

(87) PCT Pub. No.: WO2010/029620

PCT Pub. Date: Mar. 18, 2010

(65) Prior Publication Data

US 2011/0175891 A1 Jul. 21, 2011

(51) Int. Cl.
*G06F 3/038* (2013.01)
*G09G 5/00* (2006.01)

(52) U.S. Cl.
USPC .......................................... 345/212; 345/60

(58) Field of Classification Search
USPC .......................................... 345/212, 60
See application file for complete search history.

(56) References Cited

U.S. PATENT DOCUMENTS

| | | | | |
|---|---|---|---|---|
| 7,088,053 | B2 * | 8/2006 | Jin et al. | 315/169.4 |
| 2005/0083257 | A1 | 4/2005 | Iwami | |
| 2005/0116886 | A1 * | 6/2005 | Jeong et al. | 345/60 |
| 2005/0218822 | A1 * | 10/2005 | Sano et al. | 315/169.4 |
| 2006/0285399 | A1 * | 12/2006 | Iwami | 365/189.01 |

FOREIGN PATENT DOCUMENTS

| | | |
|---|---|---|
| JP | 2005-121862 A | 5/2005 |
| JP | 2005-157294 A | 6/2005 |
| JP | 2008-122930 A | 5/2008 |

* cited by examiner

*Primary Examiner* — Kwang-Su Yang

(74) *Attorney, Agent, or Firm* — Miles & Stockbridge P.C.

(57) ABSTRACT

A plasma display apparatus includes a plasma display panel including plural scanning electrodes extending in a first direction and plural address electrodes extending in a second direction crossing the first direction, an address driver to drive the address electrodes, a power recovery circuit including an inductor and a capacitor, and a switch provided in the address driver to switch connection and disconnection between the address electrodes and the power recovery circuit.

3 Claims, 16 Drawing Sheets

(a)

(b)

(a)

(b)

PLASMA DISPLAY APPARATUS WITH POWER RECOVERY CIRCUIT

TECHNICAL FIELD

The present invention generally relates to plasma display apparatuses, and more specifically, to a plasma display apparatus including an address driver that drives address electrodes.

BACKGROUND ART

Conventionally, a plasma display apparatus is known as a display apparatus that drives address electrodes with capacitive loads based on display data of lines and displays images on a display panel. The plasma display apparatus includes plural power wires to supply plural voltage levels, a control circuit to make the display data from input video signals and an address driving circuit to apply the plural voltage levels to plural address electrodes. In the plasma display apparatus, the address driving circuit selectively applies the plural voltage levels to the plural address electrodes, provides a charge distribution period between an address driving period of a line of the address electrodes and the next address driving period, disconnects the plural address electrodes from the power wires during the charge distribution period, makes a closed-loop state by connecting the address electrodes, redistributes the charges stored in the address electrodes to the address electrodes and tries to reduce the power consumption in the address period (For example, see Patent Document 1).

In this way, in the address period, by performing a so-called charge sharing that distributes charges of the address electrodes when voltage is applied to the address electrodes, since it is possible to apply the voltage to the address electrodes from a state where the charge is distributed, the applied voltage and the power consumption can be reduced.

[Patent Document 1] Japanese Patent Application Publication No. 2008-122930

DISCLOSURE OF THE INVENTION

Problems to be Solved by the Invention

However, in a configuration of the above-mentioned Patent Document 1, if the ratio of lighting to non-lighting is close to one, it is possible to perform the charge sharing and to reduce the power consumption efficiently; but if the lighting and non-lighting lose their balance, the efficiency is reduced.

FIG. 16 is a diagram showing an example of a conventional address driver. In FIG. 16, each of an address electrode A1, an address electrode A2 and an address electrode A3 constitutes a cell Cp of capacitive load, and an address driver is connected to each of the address electrodes A1-A3. The address driver includes a switch SW8 for high-level supply and a switch SW9 for low-level supply at each bit as an output stage so that the high-level voltage and low-level voltage can be supplied for the capacitive loads Cp. The capacitive loads of respective bits are connected to the switches SW7 for the charge sharing, and the switches SW7 are connected in parallel to a terminal CS for the charge sharing.

In such a configuration of the address driver, after the high-level or low-level voltage is supplied for the address electrodes A1-A3 according to the display data by the switches SW8, SW9 of the output stage, by turning off the switches SW8, SW9 of the output stage and then turning on the switches SW7 for the charge sharing, the charges that remain in the individual address electrodes A1-A3 can be averaged and distributed to the address electrodes A1-A3, and the address driver can output a next voltage from the voltage generated by the distributed charge as a starting point.

FIG. 17 is a diagram showing an example of display data during an address period. FIG. 17-(*a*) is a diagram showing a display pattern of a zigzag pattern that includes lighting (expressed by ○ in FIG. 17) and non-lightning (expressed by × in FIG. 17) in each line. In this case, the address electrodes A1, A3 become high-level voltage, and the address electrode A2 becomes low-level voltage at time t1; then the address electrodes A1, A2, A3 are connected by the switches SW7 and become an address display pattern of time t2. Hence, charges stored in the address electrodes A1, A3 are averaged and supplied for the address electrodes A1, A2, A3 before the time t2, the address electrode A2 is clamped from a voltage after the charge distribution to the high-level voltage, and the address electrodes A1, A3 are clamped to the low-level voltage. From the time t1 to the time t2, the address electrodes A1, A3 supply the charge for the address electrode A2, and the charge sharing operation contributes to power consumption reduction. This operation is performed in a similar way when the display pattern at the time 2 changes into a display pattern at time 3. In this way, when the lighting and non-lighting have a favorable balance, the charge sharing operation is performed properly.

FIG. 17-(*b*) is a diagram showing an example of display data of a stripe pattern. In FIG. 17-(*b*), the address electrodes A1-A3 are all lighted at the time t1 and none of the address electrodes A1-A3 are lighted at the time t2. In such a display pattern, the address electrodes A1-A3 remain the high-level voltage even if the switches SW7 are turned on after the time t1. Next, since none of the address electrodes A1-A3 are lighted at the time t2, the charges remaining in the address electrodes A1-A3 flow out to ground. Then, since all of the address electrodes A1-A3 are lighted in a display pattern at the time t3, the output stage changes from the low-level voltage to the high-level voltage; since the charges stored at the time t1 have been discharged; the voltage has to be supplied from the beginning after that.

In this manner, the conventional address driver can perform the charge sharing efficiently and make effective use of the power if the lighting and non-lighting cells are balanced, but cannot reduce the power consumption effectively if the lighting and non-lighting are not balanced in a display pattern.

Accordingly, the present invention may provide a plasma display apparatus that can perform the charge sharing and reduce the power consumption even if a display pattern has a poor balance between the lighting and non-lighting.

Means for Solving Problems

In order to achieve the above described objects, a plasma display apparatus according to a first aspect includes a plasma display panel including plural scan electrode extending in a first direction, plural address electrodes extending in a second direction crossing the scan electrodes, an address driver to drive the address electrodes, a power recovery circuit including an inductor and a capacitor, and a switch provided in the address driver to switch connection and disconnection between the address electrodes and the power recovery circuit.

With this structure, it is possible to connect the address electrodes to the power recovery circuit in charge sharing, and to recover the energy with the capacitor by creating LC resonance even when a display pattern has a poor balance between lighting and non-lighting.

A second aspect is characterized in the plasma display apparatus according to the first aspect in that the address driver includes plural switches corresponding to the address electrodes, and the power recovery circuit is provided outside the address driver, wherein the plural switches are connected in parallel to the power recovery circuit.

With this structure, a high-capacity device is available for the power recovery circuit, and a small device can be used in the address driver, which allows the plasma display apparatus to have a small footprint and energy recovery efficiency.

A third aspect is characterized in the plasma display apparatus according to the second aspect in that the address driver includes an address driver output stage to supply one of a high-level voltage and a low-level voltage for the address electrodes, and a control unit to control on-time of the switches based on a switching conversion ratio between the high-level voltage and the low-level voltage.

With this structure, it is possible to switch into clamping at an optimal time before starting oscillation of LC resonance, and to drive the address electrodes by making efficient use of a recovered charge.

A fourth aspect is characterized in the plasma display apparatus according to the third aspect in that the control unit shortens the on-time if the switching conversion ratio between the high-level voltage and low-level voltage is small, and lengthens the on-time if the switching conversion ratio between the high-level voltage and low-level voltage is large.

With this structure, because connection time to the power recovery circuit varies based on the switching conversion ratio between lighting and non-lighting, the connection time to the power recovery circuit can be controlled to be longer if the amount of the charge to be recovered is large or the recovered charge is used a lot, which makes it possible to perform a proper energy recovery and to make efficient use of the recovered energy.

A fifth aspect is characterized in the plasma display apparatus according to the fourth aspect in that the power recovery circuit is provided corresponding to the address driver.

With this structure, it is possible to surely fulfill the energy recovery effect by the power recover circuit at each address drivers.

A sixth aspect is characterized in the plasma display apparatus according to the fourth aspect in that the power recovery circuit is provided for plural address drivers in common.

With this structure, it is possible to reduce the number of the power recovery circuits, and to reduce footprint and cost.

A seventh aspect is characterized in the plasma display apparatus according to the first aspect in that the switch includes a first switch and a second switch connected in parallel to one of the address electrodes, and the power recovery circuit includes a first inductor, a second inductor and a capacitor connected in parallel, wherein the first switch is electrically connected to the first inductor and the second switch is electrically connected to the second inductor.

With this structure, it is possible to use different inductors for recovery between a rising edge and a trailing edge of an address pulse that drives the address electrodes, or to delay the timing of the rising edge and the trailing edge.

An eighth aspect is characterized in the plasma display apparatus according to the seventh aspect in that the address driver includes a first branch line including the first switch and a second branch line including the second switch, wherein the first branch line includes a first diode a cathode of which is connected to the address electrode side and an anode is connected to the first inductor side, and the second branch line includes a second diode an anode of which is connected to the address electrode side and a cathode is connected to the second inductor side.

With this structure, it is possible to surely prevent the oscillation of the LC resonance from being generated on the rising edge and the trailing edge by dividing paths for the rising edge and the trailing edge of the address pulse, and to maintain a highly-efficient power recovery state without performing complicated control by setting clamp timing in accordance with peak load timing.

A ninth aspect is characterized in the plasma display apparatus according to the eighth aspect in that the address driver includes an address driver output stage to supply one of the high-level voltage and the low-level voltage for the address electrodes, wherein the first switch is turned on before the address driver output stage switches output for the address electrodes from the low-level voltage to the high-level voltage, and the second switch is turned on before the address driver output stage switches output for the address electrodes from the high-level voltage to the low-level voltage.

With this structure, it is possible to make efficient use of the energy on the rising edge and to recover the energy on the trailing edge at proper timing.

A tenth aspect is characterized in the plasma display apparatus according to the ninth aspect in that a timing when the first switch is turned on and a timing when the second switch is turned on are different.

With this structure, it is possible to further reduce the power consumption.

An eleventh aspect is characterized in the plasma display apparatus according to the tenth aspect in that the address driver includes plural pairs of the first branch path and the second branch path corresponding to the plural address electrodes, and the power recovery circuit is provided outside the address driver, wherein the plural first branch paths are connected in parallel to the first inductor of the power recovery circuit, and the plural second branch paths are connected in parallel to the second inductor of the power recovery circuit.

With this structure, it is possible to make a device of the power recovery circuit high-capacity, and to make the address driver small-footprint.

A twelfth aspect is characterized in the plasma display apparatus according to the eleventh aspect in that the power recovery circuit is provided corresponding to the address driver.

With this structure, it is possible to surely fulfill the effect of the energy recovery by the energy recovery circuit at each address driver.

A thirteenth aspect is characterized in the plasma display apparatus according to the eleventh aspect in that the power recovery circuit is provided for plural address drivers in common.

With this structure, it is possible to reduce the number of the power recovery circuits, and to reduce footprint and cost.

A plasma display apparatus according to a fourteenth aspect includes a plasma display panel including plural scan electrodes extending in a first direction and plural address electrodes extending in a second direction crossing the scan electrodes, an address driver to supply an address pulse for the address electrodes and to drive the address electrodes, a switch for charge sharing included in the address driver to apply voltage resulting from an averaged charge remaining in the address electrodes to an address electrodes, wherein one end of the switch is connected to the address electrodes and the other end of the switch is connected in common, and a power recovery circuit connected to the other end of the switch is connected in common, in order to recover the averaged charge by LC resonance if there is a difference between the voltage resulting from the averaged charge and the voltage of approximately half of the address pulse.

With this structure, it is possible to recover the energy with the power recovery circuit or to make use of the recovered energy if the voltage after the charge sharing is different from the voltage of approximately half of the address pulse, and to surely reduce the power consumption even if lighting and non-lighting are not balanced.

A fifteenth aspect is characterized in the plasma display apparatus according to the fourteenth aspect in that the switch includes a first switch and a second switch connected in parallel to the address electrodes, and the power recovery circuit includes a first inductor and a second inductor connected in parallel to a capacitor, wherein the first switch is electrically connected to the first inductor and the second switch is electrically connected to the second inductor.

With this structure, it is possible to use different paths on the rising edge and the trailing edge of the address pulse, and to change connection to the inductor or timing of clamping on the rising edge and the trailing edge, by which appropriate control can be performed.

A sixteenth aspect is characterized in the plasma display apparatus according to the fifteenth aspect in that the address driver includes a first branch path including a first switch and a second branch path including a second switch, wherein the first branch path includes a first diode an anode of which is connected to a side of the first inductor and a cathode is connected to the address electrodes, and the second branch path includes a second diode a cathode of which is connected to a side of the second inductor and an anode is connected to a side of the address electrodes.

With this structure, it is possible to prevent oscillation by LC resonance, and to certainly reduce the power consumption at efficient timing as a whole.

Effect of the Invention

According to the embodiment of the present invention, it is possible to reduce the power consumption of address discharge in an address period.

EXPLANATION OF REFERENCE SIGNS

Figure 1:
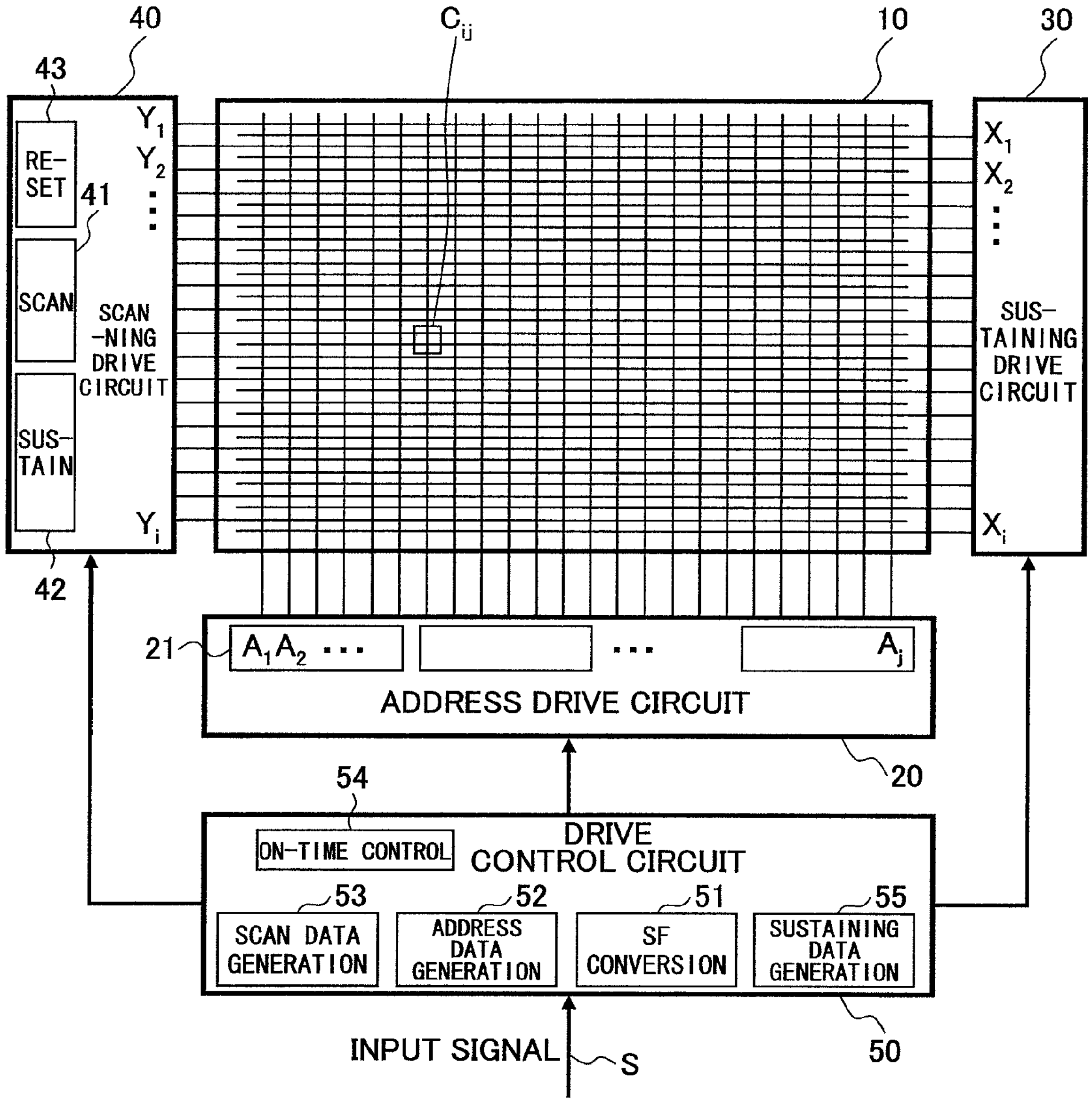
FIG. 1 is an overall configuration view of a plasma display apparatus of a first embodiment.

10 plasma display panel
11 front substrate
12 front glass substrate
13, 17 dielectric layer
14 protective film
15 back substrate
16 back glass substrate
18 rib
19, 19R, 19G, 19B phosphor
20 address drive circuit
21, 21*a* address driver
22, 22*a* address pulse output circuit
23, 24 level shift circuit
25, 25*a* power recovery circuit
30 sustaining drive circuit
40 scanning drive circuit
41 scanning circuit
42 sustaining circuit
43 reset circuit
50 drive control circuit
51 subfield conversion circuit
52 address data generation circuit
53 scan data generation circuit
54 on-time control circuit
SW1, SW11, SW12, SW2, SW3 switch
Aj address electrode

BEST MODE FOR CARRYING OUT THE INVENTION

In the following, the best mode for carrying out the present invention will be described by referring to the accompanying drawings.

First Embodiment

FIG. 1 is an overall view of a plasma display apparatus of a first embodiment of the present invention. In FIG. 1, the plasma display apparatus of the present embodiment includes a plasma display panel 10, an address drive circuit 20, a sustaining drive circuit 30, a scanning drive circuit 40 and a drive control circuit 50.

The plasma display panel 10 is a display panel to display an image. The plasma display panel 10 includes plural sustaining electrodes X1, X2, X3, . . . and plural scanning electrodes Y1, Y2, Y3, . . . extending in a transverse direction. Hereinafter, each of the sustaining electrodes X1, X2, X3, . . . or a generic name of the sustaining electrodes X1, X2, X3, . . . is called a sustaining electrode Xi, and each of the scanning electrodes Y1, Y2, Y3, . . . or a generic name of the scanning electrodes Y1, Y2, Y3, . . . is called a scanning electrode Yi. The “i” means an index. Moreover, the plasma display panel 10 includes plural address electrodes A1, A2, A3, . . . extending in a longitudinal direction. Hereinafter, each of the address electrodes A1, A2, A3, . . . or a generic name of the address electrodes A1, A2, A3, is called an address electrode Aj, and the “j” means an index. The sustaining electrode Xi and the scanning electrode Yi that extend in the transverse direction are alternately disposed in the longitudinal direction. The sustaining electrode Xi may be called X electrode Xi, and the scanning electrode Yi may be called Y electrode Yi. In a planer configuration, a discharge cell Cij is formed at a position where the sustaining electrode Xi, the scanning electrode Yi and the address electrode Aj intersect. The discharge cell Cij forms a pixel, and the plasma display panel 10 can display a two-dimensional image. The sustaining electrode Xi and the scanning electrode Yi in the discharge cell Cij have a space between them, and form a capacitive load. In a similar way, the scanning electrode Yi and the address electrode Aj in the discharge cell Cij also form a capacitive load.

The address drive circuit 20 is a circuit to drive the address electrode Aj, and supplies an address pulse of a predetermined voltage value for the address electrode Aj, and generates an address discharge. The address drive circuit 20 includes plural address drivers 21. For example, with respect to a plasma display panel 10 with horizontal 1920*vertical 1080 pixels, there are 1920 pixels in a horizontal (transverse) direction, and plural address drivers divide and drive the pixels. Each of the address drivers 21 may be configured, for example, as an IC (Integrated Circuit).

The scanning drive circuit 40 is a circuit to drive the scanning electrodes Yi, and includes a scanning circuit 41, a sustaining circuit 42 and a reset circuit 43.

The scanning circuit 41 supplies a scanning pulse of a predetermined voltage value for the scanning electrodes Yi in response to control by the drive control circuit 50 and the sustaining circuit 42, and generates the address discharge.

The sustaining circuit 42 supplies sustaining pulses of the same voltage for the scanning electrodes Yi respectively, and generates sustaining discharges.

The reset circuit 43 supplies a reset pulse of a predetermined voltage value for the scanning electrodes Yi in response to control by the drive control circuit 50, generates a reset discharge, and initializes and adjusts wall charges of the discharge cells Cij.

The sustaining drive circuit 30 is a circuit to drive the sustaining electrodes Xi, supplies sustaining pulses of the same voltage for the sustaining electrodes Xi respectively, and generates sustaining discharges. The sustaining electrodes Xi are mutually connected, and have the same voltage level.

The drive control circuit 50 is a circuit to drive and control the address drive circuit 20, the sustaining drive circuit 30 and the scanning drive circuit 40. The drive control circuit 50 includes a subfield conversion circuit 51, an address data generation circuit 52, a scanning data generation circuit 53, an on-time control circuit 54 and a sustaining data generation circuit 55.

If an input signal S of one frame or one field of a general image signal is input into the drive control circuit 50, the subfield conversion circuit 51 performs subfield conversion that divides an image of one frame or one field into plural subfields. By the converted subfields, the address data generation circuit 52 and the scanning data generation circuit 53 generate address data and scanning data needed to drive the address drive circuit 20 and the scanning circuit 41 of the scanning drive circuit 40. A sustaining data generation circuit 55 generates sustaining data needed to drive the sustaining drive circuit 30 and the scanning drive circuit 40.

The on-time control circuit 54 is a circuit to control a connection time between the address electrode Aj and a power recovery circuit (which is not shown in FIG. 1) when power recovery of the address driver 21 in the address drive circuit 20 is performed in the address discharge. The connection between the address electrode Aj and the power recovery circuit is carried out by a switch (which is not shown in FIG. 1), and the on-time control circuit 54 controls a time to connect the address electrode Aj to the power recovery circuit by turning on the switch. The on-time control circuit 54 detects lighting and non-lighting states of the address electrodes Aj regarding a line during a scan and the next line to be scanned from the address data generation circuit 52, calculates an appropriate time for the connection time between the address electrode Aj and the power recovery circuit, depending on a switching conversion ratio between the lighting and non-lighting, and controls the on-time of the switch. However, specific contents of the control and details about a concrete configuration of the address drive circuit 20 are described below.

Figure 2:
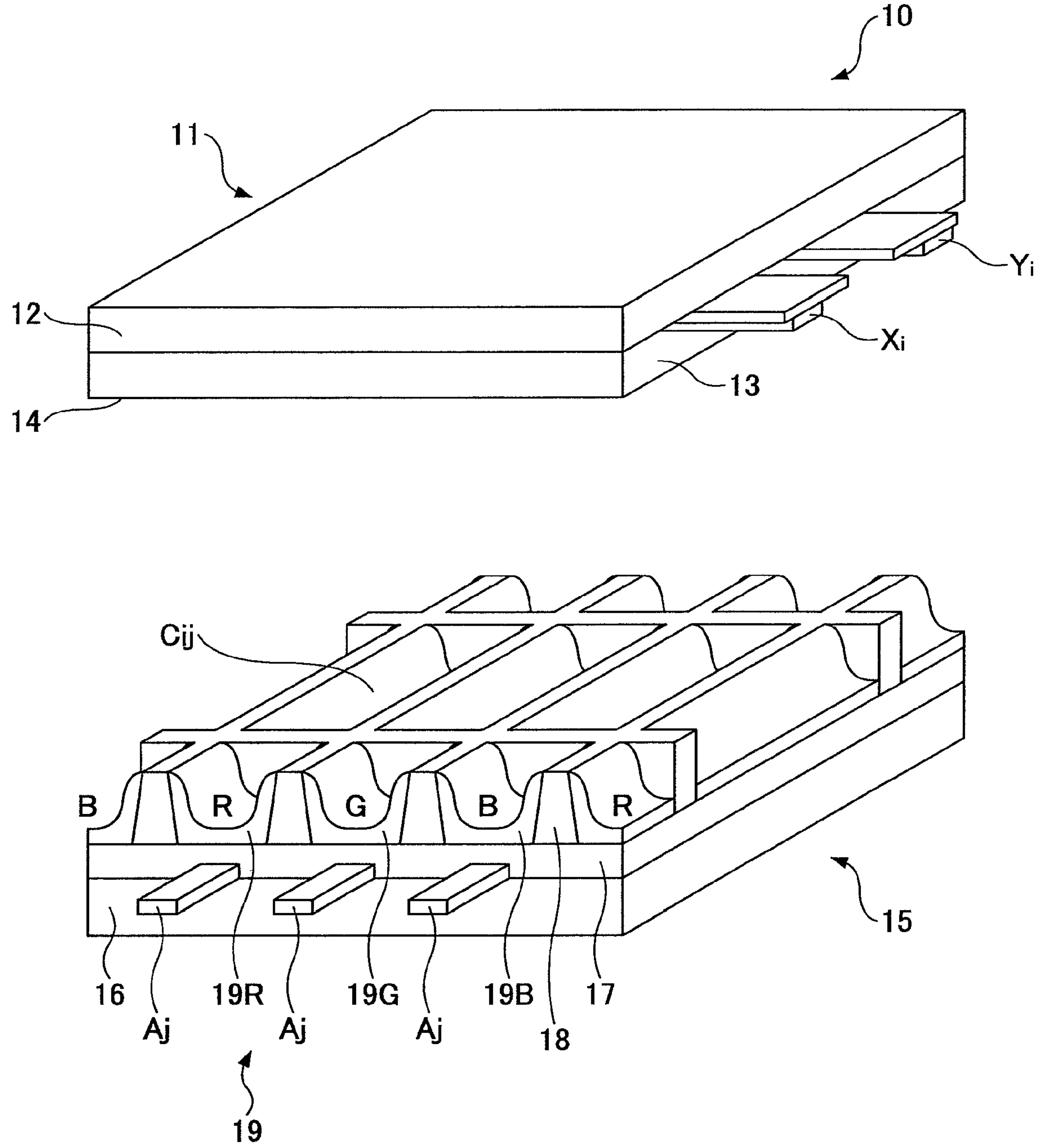
FIG. 2 is a drawing showing an example of an exploded perspective view of the plasma display panel 10.

FIG. 2 is a drawing showing an example of an exploded perspective view of the plasma display panel 10. In FIG. 2, the plasma display panel 10 includes a front substrate 11 and a back substrate 15, and is manufactured by facing and bonding the front substrate 11 and the back substrate 15.

The front substrate 11 includes a front glass substrate 12. On an inside surface of the glass substrate 12, plural sustaining electrodes Xi and scanning electrodes Yi are formed to extend in a transverse direction and to be alternately disposed in a longitudinal direction of a screen. A dielectric layer 13 and a protective film 14 cover the sustaining electrodes Xi and the scanning electrodes Yi, and then the front substrate 11 is formed.

The back substrate 15 includes the back glass substrate 16 outside. On a surface of the back glass substrate 16, plural address electrodes Aj are formed to extend in a longitudinal direction of the screen, and a dielectric layer 17 covers the plural address electrodes Aj. On the dielectric layer 17, raised ribs 18 are formed. By the ribs 18, partitions are formed on an opposed face between the front substrate 11 and the back substrate 15, by which plural cells Cij are divided and formed. An area in the ribs at a position where one of the sustaining electrodes Xi and one of the scanning electrodes Yi of the front substrate 11, and one of the address electrodes Aj intersect forms one discharge cell Cij. Furthermore, on a surface of the discharge cell Cij, that is, between adjacent ribs 18, a phosphor 19 is formed. The phosphor 19 has three types of substances, a red color phosphor 19G, a green color phosphor 19G and a blue color phosphor 19B. These three colors constitute one pixel.

Discharge gas such as Ne—Xe is sealed in a discharge space between the front substrate 11 and the back substrate 15, and ultraviolet rays generated by a discharge excites the red color phosphor 19R, green color phosphor 19G and blue color phosphor 19B, and each color emits corresponding light.

In the discharge of the discharge cells Cij, reset discharge occurs when reset pulses are applied to the scanning electrodes Yi, and wall charges for control are stored in the discharge cells Cij uniformly.

Next, the address discharge occurs when pulses are applied to the address electrodes Aj and the scanning electrodes Yi, and the wall charges are accumulated in the discharge cells Cij by the address discharge. In the address discharge, an on-signal of the address pulse (high-level voltage) is applied to the discharge cells Cij to be lighted, an off-signal of the address pulse (low-level voltage) is applied to non-lighting cells Cij not to be lighted, and the address pulses depending on the lighting or non-lighting are simultaneously applied to all of the address electrodes Ai-Aj. Then, with respect to lines of the scanning electrodes Yi to which address selection is performed, scanning pulses are applied sequentially from Y1 to Yi. Depending upon the on-off signal of the address electrodes Aj, the address discharge occurs in the discharge cells Cij to which the on-signal is applied, and the address discharge does not occur in the discharge cells Cij to which the off-signal is applied. This period, when the address discharge is generated and the discharge cells Cij to be lighted are selected, is called an address period.

Next, a sustaining pulse is applied to each of the sustaining electrodes Xi and the scanning electrodes Yi, and the discharge cells Cij in which the address discharge has occurred generate sustaining discharges and emit light because the discharge cells Cij store enough wall charge, and the discharge cells Cij in which the address discharge has not occurred do not generate the sustaining discharges and do not emit light. This period, when the sustaining discharge occurs, is called a sustaining period.

For example, a configuration of the plasma display panel 10 as shown in FIG. 2 is applicable for the plasma display apparatus of the first embodiment. In addition, since the plasma display apparatus of the present embodiment is applicable for various plasma display panels 10 that perform the address discharge, various forms of plasma display panels 10 are applicable as long as the plasma display panels 10 perform the address discharging form other than the form of the plasma display panel 10 shown in FIG. 2.

Figure 3:
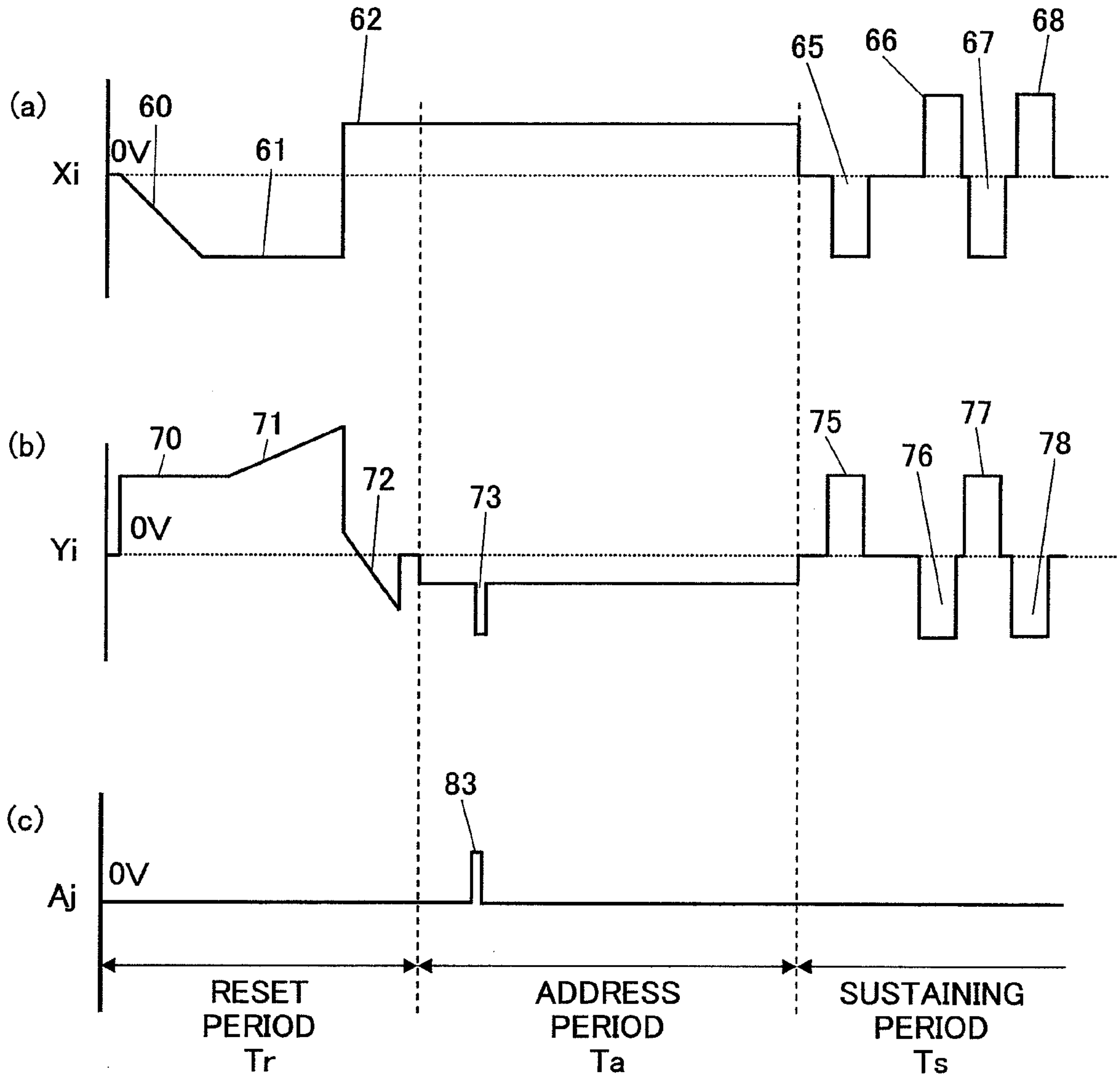
FIG. 3 is a drawing showing a drive voltage waveform applied to each electrode of one subfield, in which FIG. 3-(*a*) is a drawing showing a drive waveform of a sustain electrode Xi, FIG. 3-(*b*) is a drawing showing a drive waveform of a scan electrode Yi, and FIG. 3-(*c*) is a drawing showing a drive waveform of an address electrode Aj.

Next, an example of a drive waveform of one subfield is explained by using FIG. 3. FIG. 3 is a drawing showing a drive voltage waveform applied to the sustaining electrode Xi, the scanning electrode Yi and the address electrode Aj in one subfield. FIG. 3-(*a*) is a drawing showing the drive waveform of the sustaining electrode Xi. FIG. 3-(*b*) is a drawing showing the drive waveform of the scanning electrode Yi. FIG. 3-(*c*) is a drawing showing the drive waveform of the address electrode Aj.

In a reset period Tr, as shown in FIG. 3-(*a*) and FIG. 3-(*b*), in order to erase the charge fowled in the discharge cells Cij in the last sustaining discharge, an X erasing slope wave 60 and a Y erasing voltage 70 are applied to the sustaining electrodes Xi and the scanning electrodes Yi, respectively. Next, in order to form charges in all of the discharge cells Cij, a Y writing slope wave 71 and an X negative voltage 61 are applied to the scanning electrodes Yi and the sustaining electrodes Xi. Furthermore, in order to erase the charge formed in the discharge cells Cij, leaving a necessary amount, a Y compensation slope wave 72 and an X positive voltage 62 are applied to the scanning electrodes Yi and the sustaining electrodes Xi. This makes a reset state where the charges are formed properly in the discharge cells Cij.

In an address period Ta, in order to select and determine the discharge cells Cij to be lighted, the address discharge is carried out. The address discharge is performed by simultaneously applying a scanning pulse 73 that determines the scanning electrode Yi in a row direction and an address pulse of a high-level voltage that determines the address electrodes Aj in a column direction to the scanning electrode Yi and the address electrodes Aj, respectively. The scanning pulse 73 is sequentially applied by delaying the timing at each row such as Y1, Y2 . . . Yi, and the address pulse 83 of the high-level voltage is applied to the discharge cells Cij to be displayed that lie at intersection points of the scanning electrodes Yi with the address electrodes Aj, at a timing when the discharge cells Cij to be displayed generate the discharge, in accordance with the applied timing of the scanning pulse 73 applied at each row. In other words, a light-emitting discharge cell Cij is selected at each row, depending on the output signal of the address pulse 83. At this time, as shown in FIG. 3-(*b*) and FIG. 3-(*c*), a negative voltage is applied as the scanning pulse 73, and a positive voltage is applied as the address pulse 83.

In the address period Ta, as shown in FIG. 3-(*a*), an X positive voltage 62 is applied to the sustaining electrodes Xi. By generating the address discharge between the scanning electrodes Yi and the address electrodes Aj, the wall charges are appropriately formed by the sustaining electrodes Xi and the scanning electrodes Yi of display electrodes.

In a sustaining period Ts, first sustaining pulses 65, 75 are applied to the sustaining electrodes Xi and the scanning electrodes Yi. Next, sustaining pulses 66, 67, 68, 76, 77, 78 are repeatedly applied to the sustaining electrodes Xi and the scanning electrodes Yi, so that in the discharge cells Cij selected at the address discharge, the sustaining discharges are sustained and an image is displayed on the plasma display panel 10.

In this way, one subfield is composed of the reset period Tr, the address period Ta and the sustaining period Ts. The plasma display apparatus of the present embodiment is configured to reduce the electric power in the address period Ta, such that control that realizes the electric power reduction is performed in the address period Ta.

Figure 4:
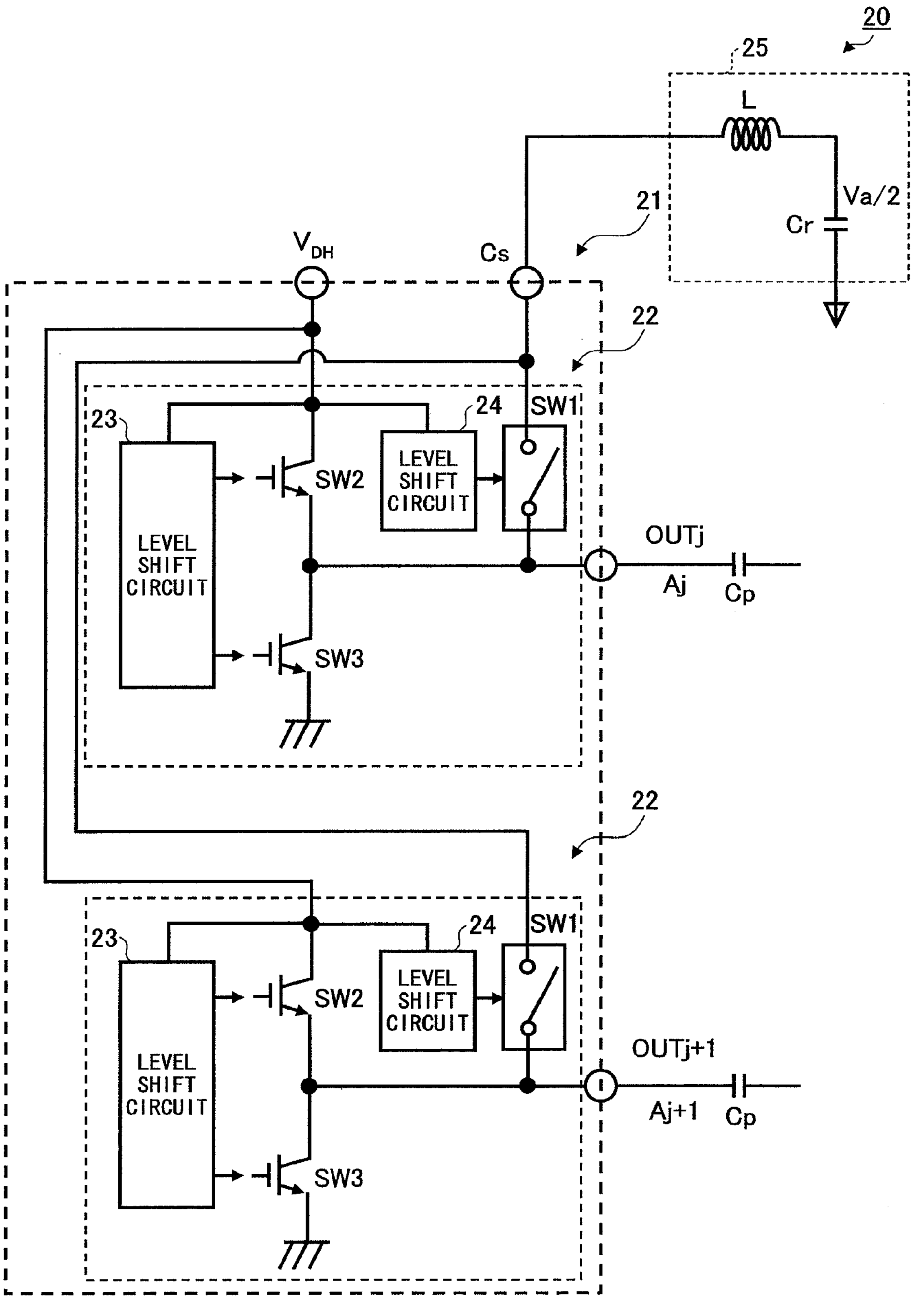
FIG. 4 is a drawing showing an example of a configuration view of an address drive circuit 20 of the first embodiment.

Next, using FIG. 4, a description is given about details of a configuration of the address drive circuit 20 of the plasma display apparatus of the present embodiment. FIG. 4 is a drawing showing the configuration of the address drive circuit 20 of the plasma display apparatus of the first embodiment.

The address drive circuit 20 of the present embodiment includes an address driver 21 and a power recovery circuit 25. The address drive circuit 20 of the present embodiment includes plural address drivers 21, but one of the address drivers 21 is shown in FIG. 4.

The address driver 21 includes respective address pulse output circuits 22 regarding respective address electrodes A1, A2 . . . Aj, Aj+1. All of the address pulse output circuits 22 may be configured to be same as long as there is no particular exception. For example, as for a plasma display panel 10 including 1920 pixels in a transverse direction, because three color cells of red, green and blue constitute one pixel, there are 5760 address pulse output circuits 22 as a whole, and the address pulse output circuits 22 are divided among plural address drivers 21 and provided for the corresponding address drivers 21. For example, hundreds of address pulse output circuits 22 are included in one integrated circuit (IC) and the plural ICs as address drivers 21 are provided in the address drive circuit 20. For example, if an address driver with 192 output terminals is used for the plasma display panel 10 of 1920 pixels, a whole address drive circuit 20 is composed of 30 address drivers 21.

The address driver 21 includes a power-supply voltage supplying terminal VDH, a charge share terminal CS, and an individual output terminal OUTj corresponding to each address electrode Aj. One of the power-supply voltage supplying terminals VDH and one of the charge share terminals CS is provided in common corresponding to each address driver 21 on a one-to-one basis. Plural output terminals OUTj are provided corresponding to respective address electrodes Aj. Each of the output terminals OUTj is connected to a corresponding address electrode Aj, and the address electrode Aj has a capacitive load Cp.

The address pulse output circuit 22 includes a switch SW1 for charge sharing, a high-voltage clamping switching device SW2 to supply high-level voltage for the address electrode Aj, a low-voltage clamping switch SW3 to supply low-level voltage for the address electrode Aj, a level shift circuit 23 for a clamping switching device and a level shift circuit 24 for charge sharing.

The switch SW1 for charge sharing is a switch to average and share charges remaining in the address electrodes Aj for the respective address pulse output circuits 22 in the address driver 21. The respective switches SW1 for charge sharing in the respective address pulse output circuits 22 are all connected in parallel to the charge share terminal Cs. When applied voltage of the address pulse generation for the scanning electrodes Yi of the ith row is discharged, the switch SW1 for charge sharing operates to utilize for charging of the address pulse generation for the next (i+1)th row of the address electrodes Yi+1. If the ratio of light emitting cells Cij to non-light emitting cells Cij is about one to one and approximately equal, when the address discharge is performed in the scanning electrode Aj of the ith row, it seems that the address electrodes A1, A2 . . . Aj−1, Aj, Aj+1 include the address electrodes Aj that have output the address pulse and the address electrodes Aj that have not output the address pulse in a mixed state and the address electrodes Aj have about half charge of the whole capacity on average. Therefore, at a timing when the address pulse applied voltage is discharged after performing the address discharge in the scanning electrode Yi of the ith row, if the switches SW1 for charge sharing are turned on and all of the address electrodes Aj are short-circuited, it is possible to utilize the charge for charging of the address pulse generation for the next scanning electrode Yi+1 of the (i+1)th row. With this, it is possible to raise the voltage by about half of the address voltage Va by the charging of the charge sharing, and to make efficient use of the charges generated in the previous address pulse generation.

However, for example, if all of the discharge cells Cij of the scanning electrode of the ith row emit light, and the discharge cells Cij of the scanning electrode of the (i+1)th row do not emit light at all, since all of the charges are grounded and released in the next (i+1)th row as long as the wall charges in the discharge cells Cij generated in the address discharge of the ith row are shared, the power consumption cannot be reduced. Such a phenomenon occurs not only if a display pattern of a complete stripe pattern is displayed, but also if the display pattern is close to the state on one level or another.

Therefore, in the plasma display apparatus of the present embodiment, even if the ratio of the light-emitting cells to the non-light-emitting cells is one-sided, in order to reduce the power consumption, the power recovery circuit 25 is connected to the charge sharing terminal CS.

The power recovery circuit 25 includes an inductor L and a capacitor Cr, and is configured to include an LC series circuit composed of the inductor L and the capacitor Cr connected in series to each other. In the power recovery circuit 25, a voltage of the capacitor Cr is maintained at Va/2, about half of the address pulse voltage Va, and the energy recovery is performed or not, based on a voltage difference between the voltage of the capacitor Cr and the charge sharing terminal CS. In other words, as in the above mentioned example, if the discharge cells Cij of the ith row are all in a light-emitting display pattern, the output terminals OUTj output the voltage Va, and if the switches SW1 for charge sharing are turned on and the discharge cells Cij are short-circuited, the voltage of the charge share terminal CS becomes about Va. In such a case, the charges are recovered into the capacitor Cr for recovery since the voltage difference is generated between the charge sharing terminal CS and the capacitor Cr. At this time, the inductor L of the power recovery circuit 25 and the capacitive load Cp of the discharge cell Cij generate LC resonance, by which the energy is recovered into the capacitor Cr. Then, if the display pattern of the $(i_+1)$th row is all non-luminous, since clamping to the low-level is performed from a state where the voltage drops to the middle voltage after recovering the energy into the power recovery circuit 25, it is possible to prevent all the reactive power from being lost for nothing.

On the other hand, if the lighting and non-lighting are balanced in the display pattern, since the voltage of the charge sharing terminal CS becomes about Va/2 when the switches SW1 are turned on in the charge sharing and all the address electrodes Aj are connected, the voltage difference from the power recovery capacitor Cr of the power recovery circuit 25 does not occur, the energy recovery is not carried out, and a usual charge sharing operation is performed.

In this way, by configuring the LC series circuit composed of the series connection between the inductor L and the capacitor Cr, by connecting the power recovery circuit 25 including the LC series circuit to the charge sharing terminal CS, and by controlling the connection and non-connection to the power recovery circuit 25 by the switches SW1 for the charge sharing, it is possible to reduce the electric power consumption for various display patterns during the address period.

Also, in FIG. 4, the power recovery circuit 25 is provided outside the address driver 21, but it is possible to place the recovery circuit 25 inside the address driver 21. In the present embodiment, descriptions are given by taking an example where the address driver 21 is configured to have small footprint and the power recovery circuit 25 is provided outside the address driver 21 so that large capacity devices are available for the inductor L and the capacitor Cr of the power recovery circuit 25. However, the power recovery circuit 25 may be placed inside the address driver 21 according to intended purpose.

In addition, a MOS (Metal Oxide Semiconductor) transistor, a bipolar transistor, an IGBT (Insulated Gate Bipolar Transistor) and the like are available for the switch SW1 for charge sharing, or other switching devices such as a relay are available.

The high-voltage clamping switching device SW2 is a switching unit to clamp the address electrode Aj to the power-supply voltage Va supplied from the supply terminal VDH, and to supply the high-level voltage for the address electrode Aj.

The low-voltage clamping switching device SW3 is a switching unit to clamp the address electrode Aj to the ground potential 0 V by connecting the circuit to ground, and to supply the low-level voltage for the address electrode Aj.

The high-voltage clamping switching device SW2 and the low-voltage clamping switching device SW3 constitute the output stage of the address driver 21.

Here, in FIG. 4, the high-voltage clamping switching device SW2 and the low-voltage clamping switching device SW3 are shown as bipolar transistors. However, high-voltage clamping switching device SW2 and the low-voltage clamping switching device SW3 may be other semiconductor switching device such as a MOS transistor, IGBT and the like, or may be another kind of switching device such as a relay.

The level shift circuit 23 for a clamping switching device is an adjustment circuit to supply voltage or current for the gate or base, in order to properly operate the high-voltage clamping switching device SW2 and the low-voltage clamping switching device SW3. Since the plasma display apparatus is operated by high voltage such as around 100 V or more, high-voltage devices are used for the high-voltage clamping switching device SW2 and the low-voltage clamping switching device SW3. Because these high-voltage devices need a high drive voltage, the level shift circuit 23 for a clamping switching device is provided to adjust the gate voltage and the like.

The level shift circuit 24 for charge sharing switching is a circuit provided for adjustment to appropriately operate the switching devices SW1 for charge sharing, and includes a function similar to the level shift circuit 23 for clamping switching device.

Figure 5:
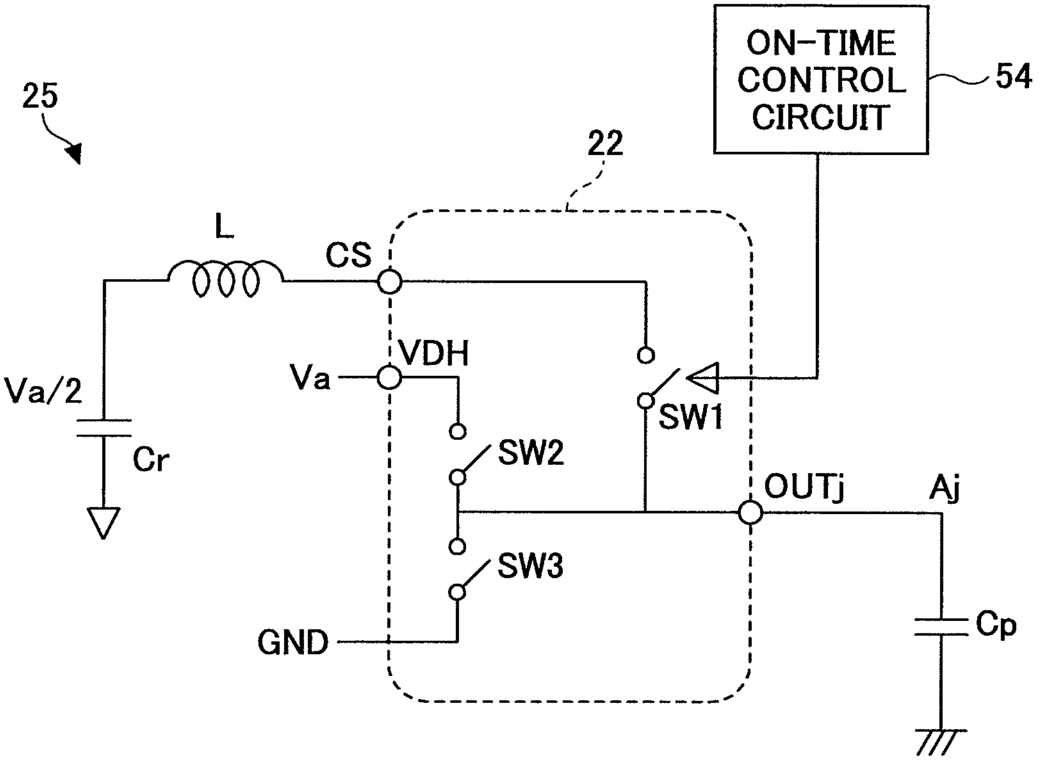
FIG. 5 is a drawing showing an example of an address pulse output circuit 22 and a power recovery circuit 25.
Figure 6:
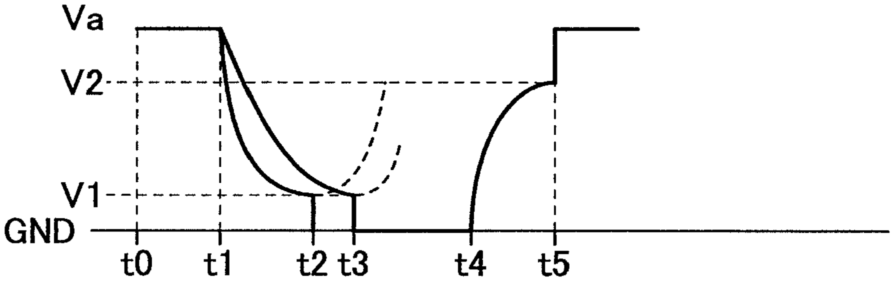
FIG. 6 is a drawing showing an example of a waveform of an address pulse, in which FIG. 6-(*a*) is a drawing showing an example of a voltage waveform on a rising edge and a trailing edge of the address pulse, and FIG. 6-(*b*) is a drawing showing an example of a voltage waveform on the trailing edge of the address pulse.
Figure 6:
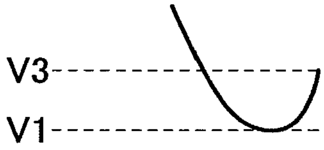

Next, operation of the plasma display apparatus of the embodiment is explained, using FIG. 5 and FIG. 6. FIG. 5 is a drawing extracting and showing one bit of the address pulse output circuit 22 and the power recovery circuit 25 by simplifying FIG. 4. In FIG. 5, the high-voltage clamping switching device SW2 and the low-voltage clamping switching device SW3 are both shown by simplified symbols as SW2, SW3. Hereinafter, the names are simplified, and the high-voltage clamping switching device SW2 may be called a switch SW2, and the low-voltage clamping switching device SW3 may be called a switch SW3. Moreover, the level shift circuits 23, 24 are omitted in FIG. 5. On the contrary, an on-time control circuit 54 in the control drive circuit 50 is shown in FIG. 5.

Furthermore, FIG. 6 is a drawing showing an example of a waveform of an address pulse applied to the address electrode Aj, in which FIG. 6-(*a*) is a drawing showing voltage waveform of rising and trailing states of the address pulse, and FIG. 6-(*b*) is a drawing showing an example of a voltage waveform of the trailing state of the address pulse.

In the plasma display apparatus configured as shown in FIG. 5, an applied operation of the address pulse to the address electrode Aj during the address period Ta is considered. To begin with, if the switches SW1, SW2, SW3 are all in an off-state first, then when the switch SW2 is turned on, an address pulse Va of high-level voltage is supplied for the address electrode Aj. In FIG. 6, the address pulse is clamped to the high-level voltage Va and output in the period from time t0 to time t1.

Next, when the switch SW2 is turned off and the switch SW1 for charge sharing is turned on, the address electrode Aj is connected to the power recovery circuit 25. Here, if there is a voltage difference between the charge sharing terminal CS and the capacitor Cr, the LC resonance by the inductor L and the capacitor load Cp is generated, and the charge remaining in the address electrode Aj is stored and recovered in the power recovery capacitor Cr by the LC resonance. In FIG. 6, the charge sharing and the power recovery start at time t1, and the voltage applied to the address electrode Aj decreases due to the LC resonance.

Next, when the switch SW1 is turned off, the LC resonance stops. FIG. 6-(*a*) shows a case where the switch SW1 is turned off at time t2, and a case where the switch SW1 is turned off at time t3, corresponding to two LC resonances. In this way, the on-time that makes a connection state between the address electrode Aj and the power recovery circuit 25 by turning on the switch SW1 is variable depending on the waveform of the LC resonance. The on-time of the switch SW1 for charge sharing may be controlled by, for example, the on-time control circuit 54 provided in the drive control circuit 50. The on-time control circuit 54 is a control unit that controls a time to continue an on-state of the switch SW1. The on-time control unit 54 compares the display data between the scanning electrode that is already scanned and the next scanning electrode to be scanned during the address period, controls to lengthen the on-time of the switch SW1 if switching conversion ratio between the high-level voltage and the low-level voltage of the output stage is large, and controls to shorten the on-time of the switch SW1 if the switching conversion ratio is small. In other words, depending on the charge movement amount, the on-time of the switch SW1 is controlled to be longer when the charge movement amount is large, and the on-time of the switch SW1 is controlled to be shorter when the charge movement amount is small.

FIG. 6-(*b*) is a drawing showing an example of a voltage waveform of a trailing edge by LC resonance of an address pulse. In FIG. 6-(*b*), since the on-time of the switch SW1 is set long, the LC resonance starts vibration and the voltage increases and reaches the voltage V3, after the voltage reaches the minimum voltage V1. In such a state, even if the charge stored in the power recovery circuit 25 is supplied for the address electrode Aj for the power saving, the efficiency decreases because the clamping to the low-level voltage is performed from the voltage V3 a little above the minimum voltage V1. The time to turn off the switch SW1 is to preferably coincide with the timing when the LC resonance becomes the minimum voltage V1 as much as possible.

Therefore, the on-time control circuit 54 carries out control to change the on-time of the switch SW1 so as to be optimal, depending on the switching conversion ratio of supply voltage of the address pulse, to prevent a state shown by dotted limes in FIG. 6-(*a*).

Figure 17:
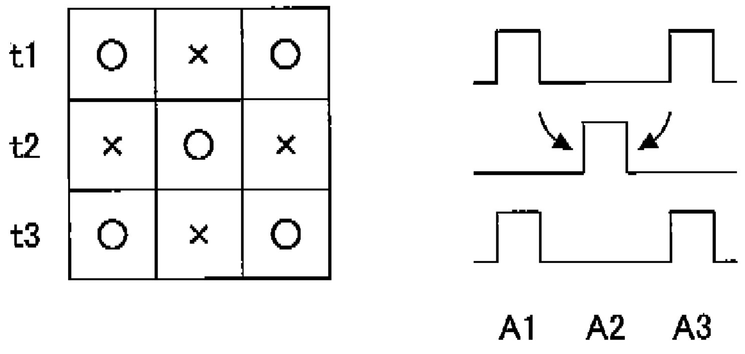
FIG.17 RELATED ART
FIG. 17 is a drawing showing an example of display data in an address period, in which FIG. 17-(*a*) is a drawing showing a display pattern of a zigzag pattern, and FIG. 17-(*b*) is a drawing showing an example of display data of a stripe pattern.
Figure 17:
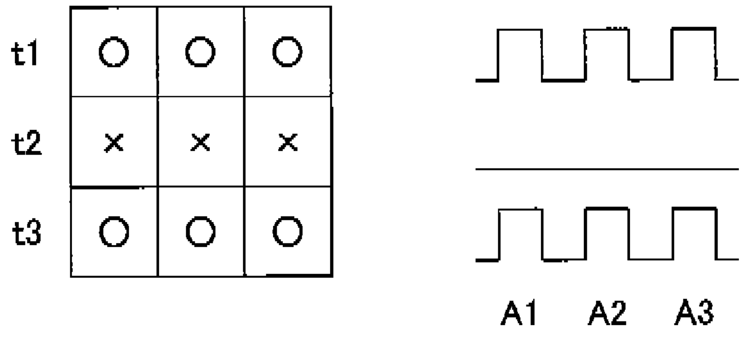
FIG.17 RELATED ART

However, even if the switching conversion ratio between the high-level voltage and the low-level voltage of the output stage of the address pulse output circuit 22 is high, there is a case where the charge sharing needs less time, as in a case of a zigzag pattern shown in FIG. 17-(*a*). In this case, since there is no voltage difference between the charge share terminal CS and the capacitor Cr of the power recovery circuit 25, and the power recovery circuit 25 does not substantially operate, there is no problem if the on-time of the switch SW1 is set long.

After the switch SW1 is turned off at time t2 or time t3, the switch SW3 is turned on, and the low-level voltage is supplied for the address electrode Aj, which is clamped to the low-level voltage. For example, the low-level voltage may be 0 V. Even if the ratio between the lighting and non-lighting in the display data is not equal but one-sided in either direction, because the power recovery circuit 25 recovers the energy until the voltage of the address electrode decreases from Va to the middle voltage V1, and then the address electrode Aj is clamped to the low-level, reducing the power consumption is possible.

Next, if the address pulse is changed into the high-level voltage, the switch SW1 is switched from off to on. By doing this, the energy stored in the capacitor Cr in the power recovery circuit 25 is applied to the address electrode Aj. At this time, the LC resonance by the inductor L in the power recovery circuit 25 and the capacitor load Cp of the address electrode Aj causes the charge to move to the address electrode Aj. In FIG. 6, the switch SW1 is turned on in time t4-t5, and the voltage of the address electrode Aj increases due to by the LC resonance.

Next, by turning off the switch SW1, by turning on the switch SW2 after that, and by supplying the high-level voltage for the address electrode Aj from the output stage, the address electrode Aj is clamped to the high-level voltage Va. In FIG. 6, the address electrode Aj is clamped to the high-level voltage Va at time t5. In this case, as described in FIG. 6-(*b*), it is preferable to control to turn off the switch SW1 for charge sharing at the timing when the increase of the voltage of the address electrode Aj reaches the peak voltage V2 in order to control to use the stored energy the most efficiently. Here, the specific control method of the on-time control circuit 54 is similar to the description in FIG. 6-(*b*), therefore the description is omitted.

Figure 7:
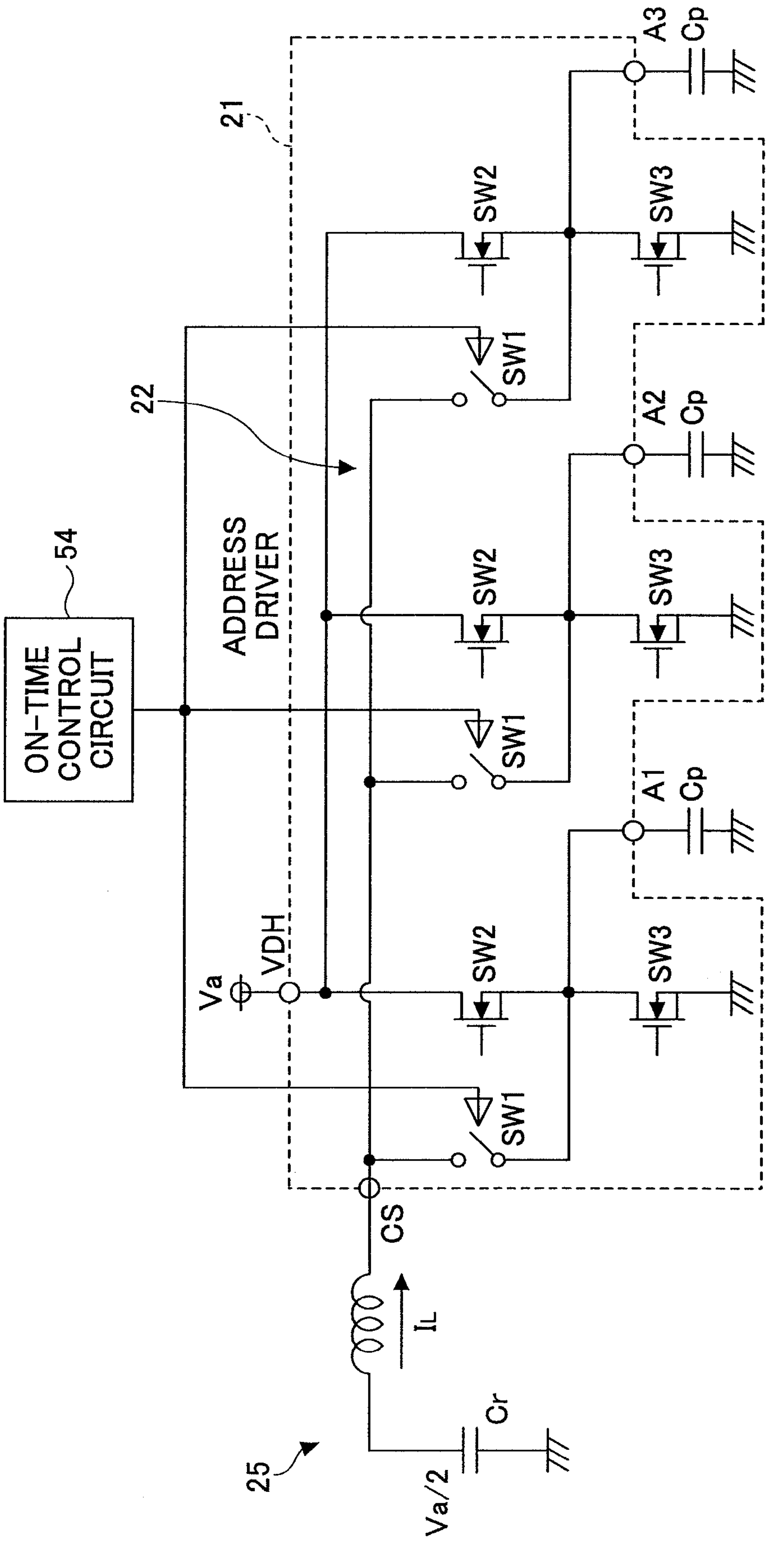
FIG. 7 is a drawing showing an example of a configuration of an address driver 21 of the first embodiment.

Next, using FIG. 7, descriptions are given about a case where the address pulse output circuit 22 in FIG. 5 is incorporated into an address driver 21. FIG. 7 is a drawing showing an example of a configuration of an address driver 21 of the plasma display apparatus of the first embodiment.

FIG. 7 shows the address driver including three bits of address pulse output circuits 22 corresponding to the address electrodes A1-A3. The address driver 21 includes more address pulse output circuits 22, but in FIG. 7, only three bits of the address pulse output circuits 22 are shown. In the address driver 21, the switches SW2, SW3 that constitute the output stage, and the switch SW1 for charge sharing is provided. The switches SW2, SW3 that constitute output states of the address driver 21 are composed of MOS transistors. The switch SW1 may be composed of a MOS transistor similar to the switches SW2, SW3, or may be composed of another switching device. In addition, a power recovery circuit 25 is connected to the charge sharing terminal CS. Furthermore, an on-time control circuit 54 that controls on-time of the switch SW1 is provided outside the address driver 21.

In the configuration of the plasma display apparatus, a case is considered where an address discharge corresponding to the display pattern described in the FIG. 17-(*b*), a stripe pattern by all lines such as lighting and non-lighting and lighting, is performed. In FIG. 7, if all of the switches SW2 that supply high-level voltage Va are switched from on to off, the charges are stored in the address electrodes A1-A3, and the voltages are all Va. Next, if the switches SW1 are turned on, and the address electrodes A1-A3 are connected in parallel to the power recovery circuit 25, the voltage of the charge sharing terminal CS becomes Va. Because the voltage of the capacitor Cr in the power recovery circuit 25 is about Va/2 and has a voltage difference from the Va, the current flows toward the capacitor Cr due to the LC resonance of the inductor L and the capacitive load Cp of the address electrodes A1-A3.

Next, the switch SW1 is turned off, by which the address electrode Aj and the power recovery circuit 25 are disconnected. At this time, the period of the on-time of the switch SW1, and timing when the switch SW1 is turned off, may be controlled by the on-time control circuit 54, and, as mentioned above, may be controlled depending on the switching conversion ratio between the high-level and low-level voltages in the output stage. In this case, since the switching pattern is one in which three output stages all switch on and off, the on-time can be set long.

Next, the switches SW3 are all turned on, and the address electrodes Aj are clamped to the low-level voltage, for example, ground potential. With this, a display pattern becomes all non-lighting.

Next, when the switches SW1 are all turned on, the address electrodes Aj and the power recovery circuit 25 are connected. At this time, because the charge sharing terminal CS becomes grounded, approximately Va/2 of voltage difference is generated from the capacitor Cr, current $I_L$ flows into the inductor L due to the LC resonance of the inductor L and the capacitor load Cp of the address electrodes Aj, and flows into the address electrodes Aj so that the voltages of the address electrodes Aj gradually increase.

Next, by switching the switch SW1 from on to off before flowing of all of the current $I_L$, and next by switching the switch SW2 from off to on, it is possible to perform switching at the most efficient timing and to reduce the consumption of electric energy. The on-time of the switch SW1 may be controlled by the on-time control circuit 54.

Figure 8:
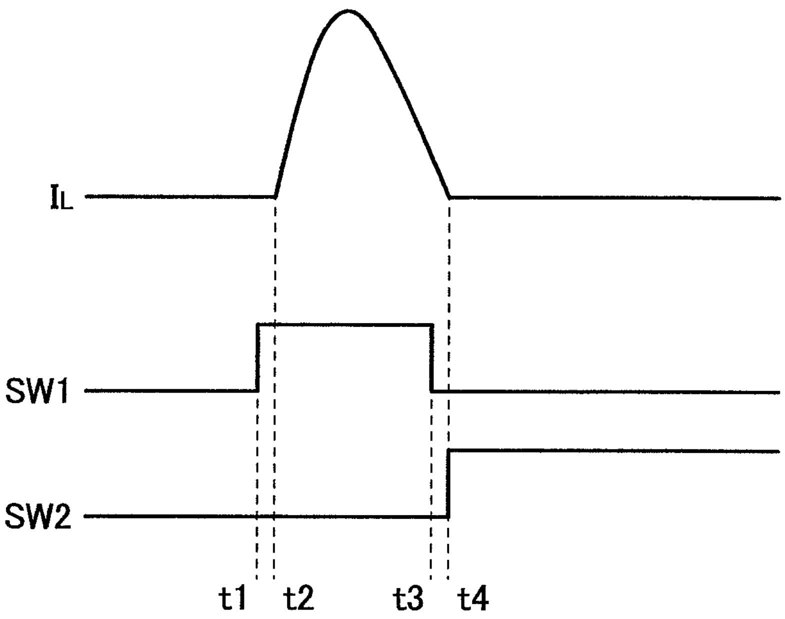
FIG. 8 is a drawing showing an example of switching timing of the address driver 21.

FIG. 8 is a drawing showing an example of switching timing of the address driver 21 shown in FIG. 7. If the voltage of the address electrode Aj is switched from the high-level to the low-level, when the switch SW1 is turned on at time t1, the inductor current $I_L$ starts flowing at time t2 a little later. Then, by switching the switch SW1 off at time t3 before the current that flows through the inductor L completely flows out, and by switching the switch SW2 on, it is possible to turn on the switch SW2 at timing when the current $I_L$ has completely flowed out and to perform switching at timings when the electric power consumption is the most efficiently reduced.

For example, it is preferable for the on-time control circuit 54 to control the on-time of the switch SW1.

In this way, according to the plasma display apparatus of the first embodiment, even if the display pattern has a poor balance between the lighting and non-lighting, improving the electric power efficiency is possible by using the power recovery circuit 25. Also, it is possible not to use the power recovery circuit 25 if the balance is adequate, to make use of the power recovery circuit 25 depending on a degree of the balance between the lighting and non-lighting, and to improve the power efficiency for any display pattern.

Here, an example is given where the on-time control circuit 54 is provided in the drive control circuit 50, but for example, the on-time control circuit 54 may be provided in a logic circuit included in the address driver 21. Because the logic circuit in the address driver 21 receives image data of the R, G, B of light's three primary colors that a image signal processing LSI has converted as serial data and returns to the image data by converting into parallel data, it is also possible to detect the display data at this stage.

Figure 9:
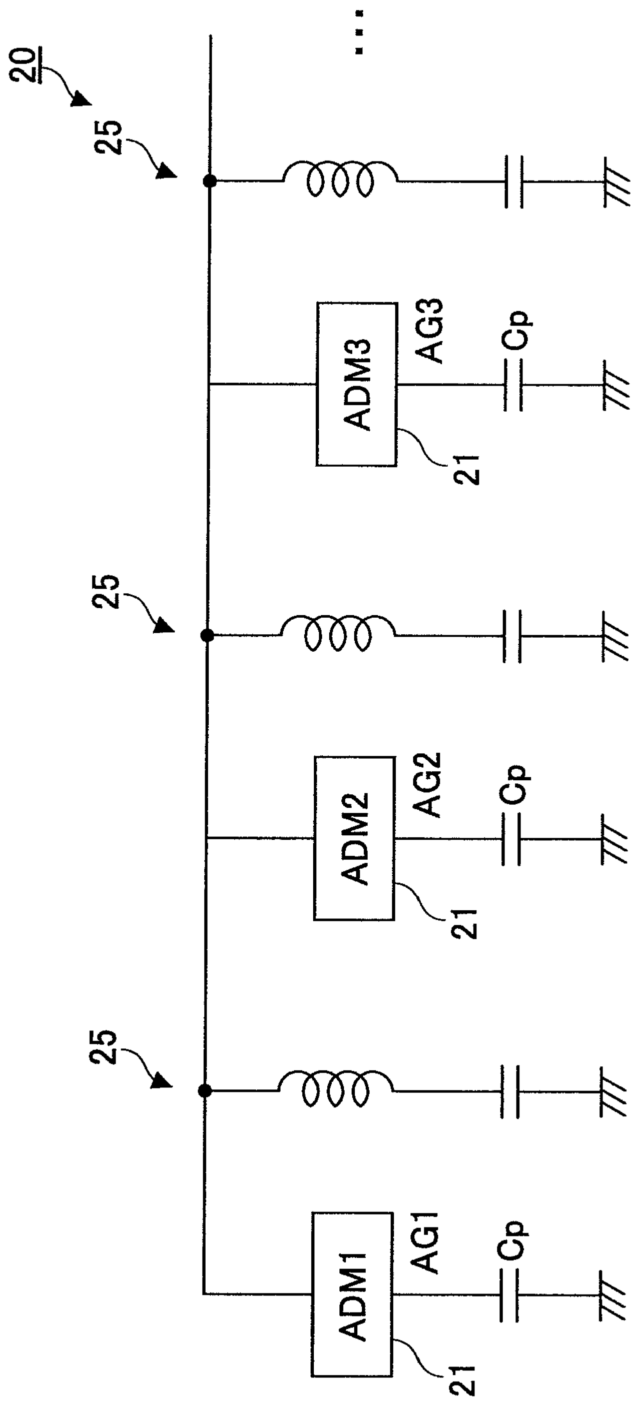
FIG. 9 is a drawing showing an example of a setting method of a power recovery circuit 25.

Next, using FIG. 9, a description is given about an installation example of a power recovery circuit 25. FIG. 9 is a drawing showing an example where the power recovery circuits 25 are disposed corresponding to respective address drivers 21.

In FIG. 9, plural address drivers 21 are disposed in an address drive circuit 20, and three of the address drivers 21 are shown. Each of the address drivers 21 drives plural bits of the address electrodes Aj. Here, corresponding to the address drivers 21, plural address electrodes Aj are grouped and shown as an address electrode group AG such as AG1, AG2, AG3, . . . .

In the address drivers 21, power recover circuits 25 are provided corresponding to the address drivers 21 one to one. The power recovery circuits 25 and the corresponding address drivers 21 are connected in parallel to each other. In this way, the power recovery circuits 25 may be provided corresponding to the address drivers 21, and may be connected in parallel to each other. With this, it is possible to certainly exert the effect of the power recovery at a position near the each of the address drivers 21, and to make the address drive circuit 20 have the whole uniformity.

Figure 10:
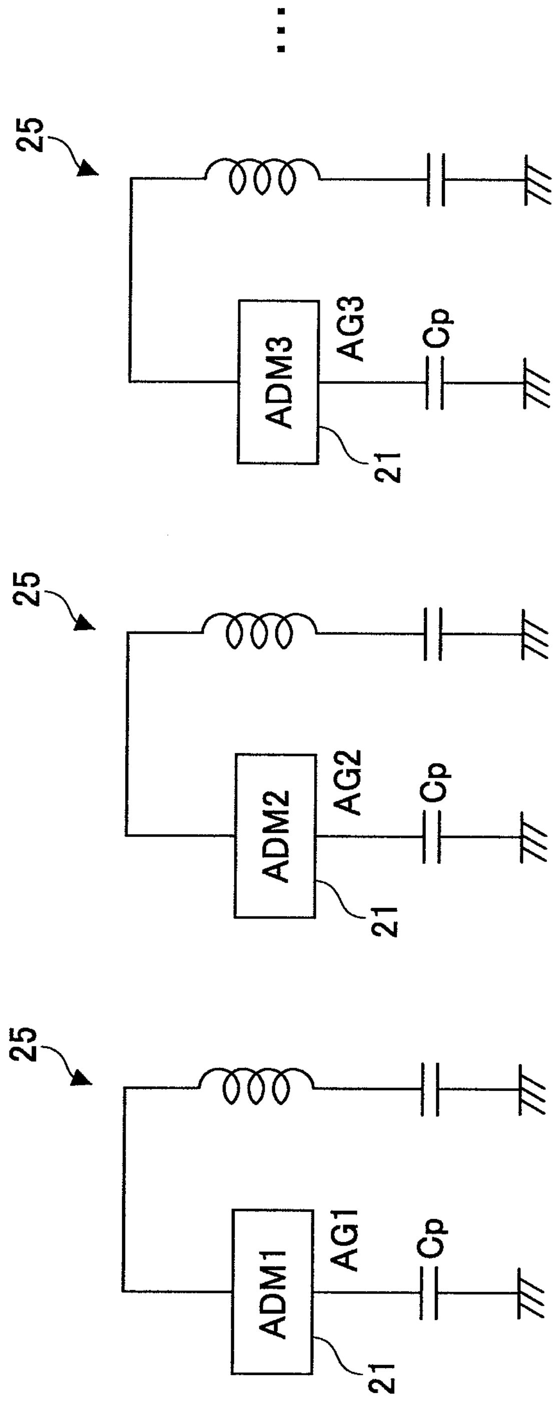
FIG. 10 is a drawing showing an example of a setting method of the power recovery circuit 25 different from FIG. 9.

FIG. 10 is a drawing showing an example of an installation method of the power recovery circuit 25 different from FIG. 9. In FIG. 10, the installation method is similar to the installation method in FIG. 9 in that the power recover circuits 25 are provided one-to-one corresponding to the address drivers 21, but different from the installation method in FIG. 9 in that the power recovery circuits 25 are not connected to each other in FIG. 10. With this, it is possible to recover the electric energy completely corresponding to each of the address drivers 21, to effectively exert the ability of each of the power recovery circuits 25 without influence such as connection resistance and the like, and to reduce the electric power loss during the power recovery.

In this way, the power recovery circuits 25 may be provided one-to-one completely corresponding to the address drivers 21 including electric connections.

Figure 11:
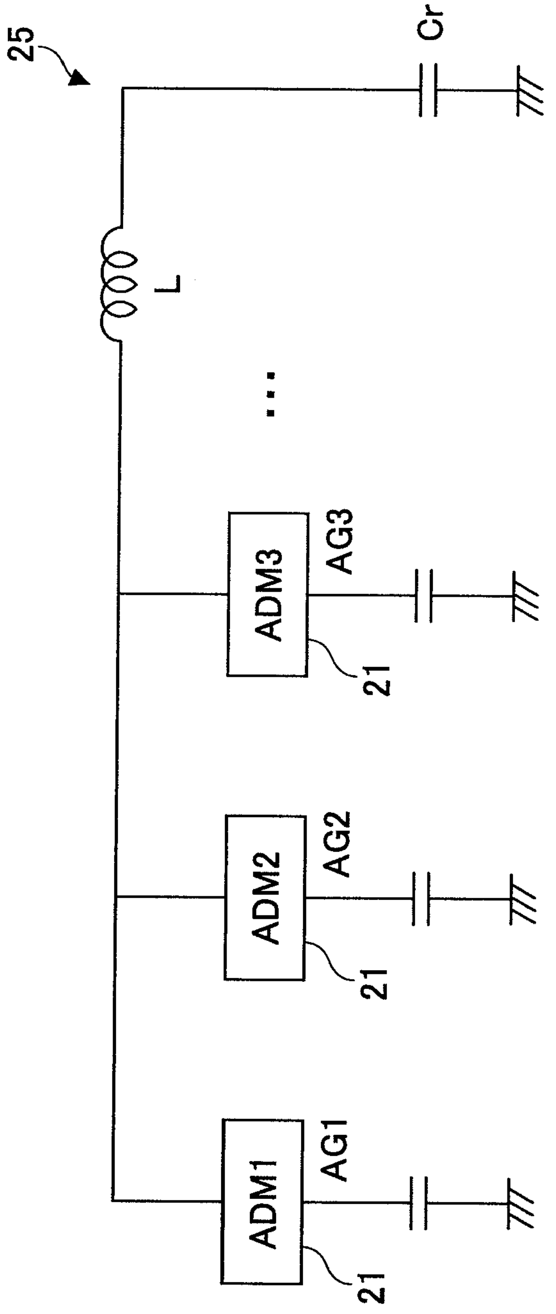
FIG. 11 is a drawing showing an example of a setting method of the power recovery circuit 25 different from FIG. 9 and FIG. 10.

FIG. 11 is a drawing showing an example of an installation method of the power recovery circuit 25 different from FIG. 9 and FIG. 10. In FIG. 11, the charge sharing terminals CS of respective address drivers 21 are connected in parallel to each other, and one power recovery circuit 25 is provided corresponding to plural address drivers 21. In this way, not individual installations, but power recover circuit 25 may be provided for the plural address drivers 21. If the power recovery circuit 25 has enough capacity, such a configuration is possible. With this, it is possible to distribute the charge to the many address electrodes Aj by the charge sharing, and to respond to imbalance of the display pattern in a wide range.

Here, one common power recovery circuit 25 may be installed for all in a horizontal direction of the address drivers 21, or for example, the address drivers 21 may be divided into small groups including around 2-20 address drivers 21, and one common power recovery circuit 25 may be provided for each of the groups.

As described in FIG. 9 through FIG. 11, the number of the power recovery circuits 25 may vary depending on the relationship to the address drivers 21. Moreover, the power recovery circuit 25 is preferably provided in the address drive circuit 20, but the embodiments are not limited to this mode, and it is possible to provide the power recovery circuit 25 in any part as long as the connection to the address driver 21 is properly performed.

Second Embodiment

Figure 12:
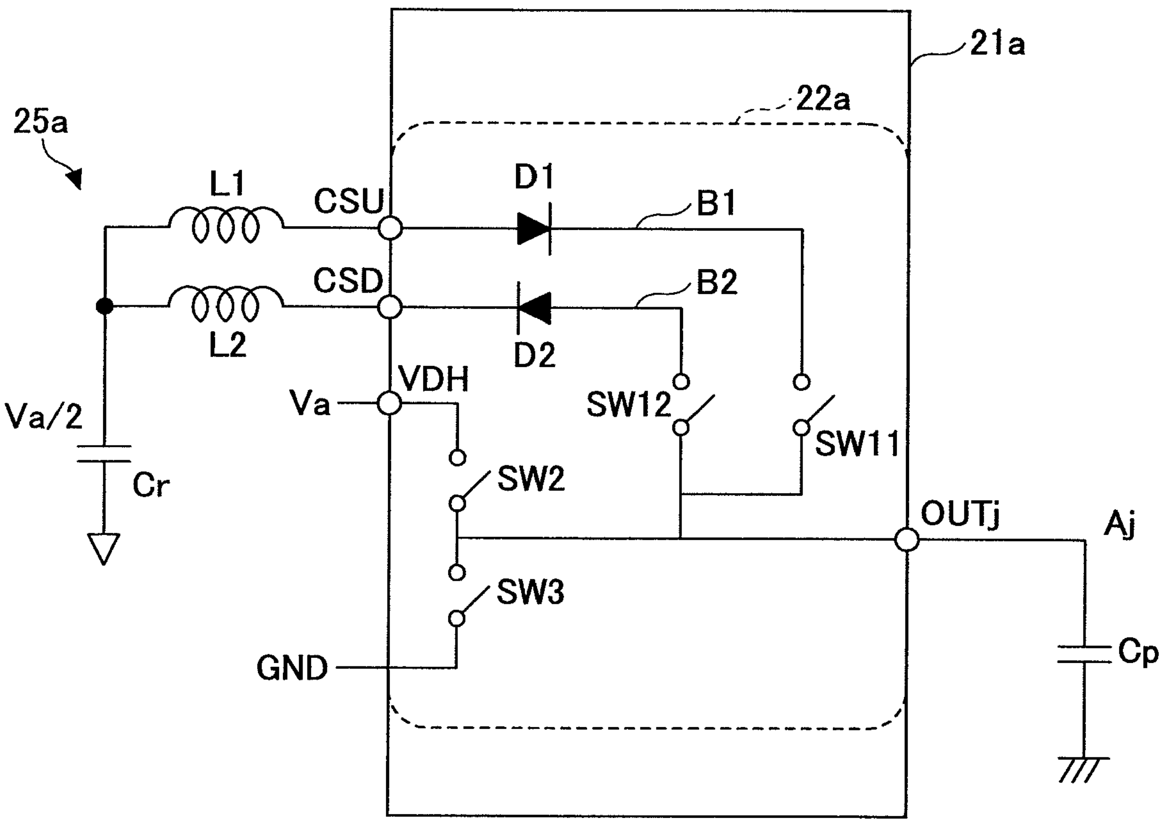
FIG. 12 is a drawing showing an outline configuration of a plasma display apparatus of a second embodiment.

FIG. 12 is a drawing showing an outline configuration of a plasma display apparatus of a second embodiment of the present invention. The plasma display apparatus of the second embodiment is, regarding an overall configuration, similar to the plasma display apparatus of the FIG. 1 except in that the on-time control circuit 54 of the plasma display apparatus in the FIG. 1 of the first embodiment becomes unnecessary. Moreover, regarding a panel configuration, the plasma display panel of the second embodiment is similar to the plasma display panel 10 in FIG. 2 of the first embodiment. Furthermore, regarding a configuration of one subfield, the plasma display apparatus of the second embodiment is similar to the subfield configuration in FIG. 3 of the first embodiment. Hence, regarding these points, descriptions are omitted.

The plasma display apparatus of the second embodiment is different from the plasma display apparatus of the first embodiment in that there are provided two charge share switches SW11, SW12 of an address pulse output circuit 22*a* and two inductors L1, L2 of a power recovery circuit 25*a*, and diodes D1, D2 are inserted and connected between the switch SW11 and the inductor L1 and between the switch SW12 and the inductor L2, respectively. In addition, the plasma display apparatus of the second embodiment is different from the plasma display apparatus in FIG. 5 of the first embodiment in that the on-time control circuit 54 is removed.

In FIG. 12, the plasma display apparatus of the second embodiment includes one bit of an address pulse output circuit 22*a* provided in the address driver 21*a*, corresponding to the address electrode Aj. An output stage in the address pulse output circuit 22*a* is composed of a switch SW 2 that supplies high-level voltage for the address electrode Aj, and a switch SW3 that supplies low-level voltage for the address electrode Aj, and these points are similar to the address pulse output circuit 22.

In the address pulse output circuit 22*a* of the second embodiment, one end of a first switch SW11 and one end of a second switch SW12 are connected in parallel to the address electrode Aj. The first switch SW11 is provided in a first branch path B1 in the address driver 21*a*, and the second switch SW12 is provided in a second branch path B2 in the address driver 21*a*. A cathode side of the first diode D1 is connected to the other end of the first switch SW11. An anode side of the first diode D1 is connected to the first inductor L1. The first inductor L1 is connected to the capacitor Cr for the power recovery.

In a similar way, an anode side of the second diode D2 is connected to the opposite end to the end connected to the address electrode Aj of the second switch SW12, and a cathode side of the second diode D2 is connected to the second inductor L2. The second inductor L2 is connected to the capacitor Cr for the power recovery. The first inductor L1 and the second inductor L2 are connected in parallel to the capacitor Cr.

In this way, in the plasma display apparatus of the second embodiment, the first branch path B1 including the first switch SW11 and the second branch path B2 including the second switch SW12 are provided in the address driver 21*a*, by which current paths are different in the rising edge and trailing edge of the address pulse. In other words, in the rising edge of the address pulse, the voltage is supplied for the address electrode Aj by the LC resonance by way of the capacitor Cr for the power recovery, the first inductor L1, the first diode D1 and the first switch SW11. In a similar way, in the trailing edge of the address pulse, the charge remaining in the address electrode Aj is recovered in the capacitor Cr by way of the second switch SW12, the second diode D2, and the second inductor L2.

In this way, by dividing the path between the power recovery circuit 25*a* and the address electrode Aj into the first branch path B1 and the second branch path B2 in the rising edge and the trailing edge of the address pulse, and by providing the first diode D1 and the second diode D2 for backflow prevention in the first branch path B1 and the second branch path B2, respectively, it is possible to prevent vibration generation by the LC resonance. More specifically, in the plasma display apparatus of the first embodiment, in order to prevent the vibration of the LC resonance, it is necessary to properly control the on-time of the switch SW1 for the charge sharing, based on the switching conversion ratio between the high-level voltage and the low-level voltage. However, in the plasma display apparatus of the second embodiment, it is possible not to need such a complicated control by dividing the path of the LC resonance and by providing the diodes D1, D2 for the backflow prevention.

Next, operation of the plasma display apparatus of the second embodiment is explained more specifically, continuing to use FIG. 12. In FIG. 12, if the switch SW2 is turned on, high-level voltage Va is supplied for the address electrodes Aj.

Next, if the switch SW2 is turned off, and the second switch SW12 is turned on, the address electrode Aj is connected to the second inductor L2 of the power recovery circuit 25*a*. Then, the voltage of the charge sharing trailing edge terminal CSD becomes Va, and voltage difference from the voltage Va/2 of the capacitor Cr for the power recovery is generated. Therefore, the LC resonance occurs between the second inductor L2 and the capacitor load Cp of the address electrode Aj, and the current flows from the address electrode Aj to the power recovery circuit 25*a* by way of the second diode D2 connected in a forward direction, and the electric energy is stored in the power recovery capacitor Cr. At this time, since the second diode D2 for the backflow prevention is provided, the current only flows from the address electrode Aj to the capacitor Cr, and the vibration due to the LC resonance does not occur.

Next, the second switch SW12 is turned off and the switch SW3 of the low-level voltage supply side in the output stage is turned on, and the address electrode Aj is clamped to the ground potential of the low-level voltage. At this time, it is preferable for the timing of turning off the second switch SW12 to be adjusted to the time of the maximum load.

Figure 13:
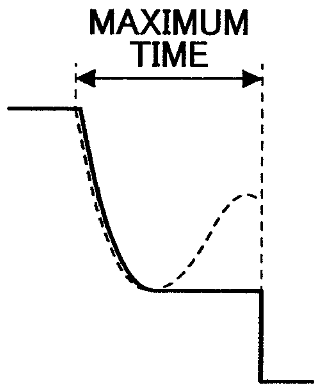
FIG. 13 is an explanation drawing of a setting method of on-time of a second switch SW12.

FIG. 13 is a drawing to explain a setting method of an on-time of the second switch SW12. In FIG. 13, an example of a voltage waveform in the trailing edge is shown. In the plasma display apparatus of the second embodiment, there is no vibration phenomena shown in a dotted line in FIG. 13 such that the voltage rises from the minimum voltage of the LC resonance; there is a waveform only decreasing as shown in a solid line. Therefore, if the on-time of the second switch SW12 is set at a length of time that can meet the maximum load, the voltage waveform without vibration can be formed as shown in the solid line in FIG. 13. With this, it is possible not to need the on-time control described in the first embodiment, and to reduce the consumed power, configuring the plasma display apparatus simply.

The explanation returns to FIG. 12. If the high-level voltage Va is applied to the address electrode Aj after clamping the address electrode Aj to the ground potential by turning on the switch SW3, the switch SW3 is turned off and next, the first switch SW11 is turned on. When the first switch SW11 is turned on, the address electrode Aj is connected to the power recovery circuit 25*a*. Here, since the voltage of the charge sharing rising edge terminal CSU is a ground potential, which has a voltage difference from the voltage Va/2 of the capacitor Cr in the power recovery circuit 25*a*, the LC resonance occurs between the first inductor L1 and the capacitive load Cp of the address electrode Aj. Then, the voltage is supplied for the address electrode Aj by the LC resonance by way of the first diode D1 connected in a forward direction from the first inductor L1 and the address electrode Aj.

Next, the first switch SW11 is turned off. At this time, it is enough to set the timing turning off the first switch SW11 by adjusting the on-time of the first switch SW11 to the maximum load, and is particularly unnecessary to perform control that changes the on-time in accordance with the display pattern. This is because in the rising edge of the address pulse, the first diode D1 for the backflow prevention can prevent the current by the vibration of the LC resonance from flowing from the address electrode Aj side to the first inductor L1.

Next, by turning on the switch SW2 and by supplying the high-level voltage Va for the address electrode Aj, the voltage of the address electrode Aj is clamped to the high-level voltage Va. Hereinafter, by a similar process, it is possible to perform the address discharge, using the power efficiently.

Here, in FIG. 12, with regard to the first inductor L1 and the second inductor L2 of the power recovery circuit 25*a*, similar characteristic of inductors L1, L2 are available and different characteristic of inductors L1, L2 are also available. For example, there is a case where rise time of the address pulse is desired to be short and the fall time of the address pulse is desired to be long. More specifically, if the fall time of the address pulse is short and the waveform is precipitous, there is a case where the applied address pulse affects the scanning pulse and the like in the next address pulse applying. In such a case, it is possible to set the inductance of the second inductor L2 connected to the second path B2 for a fall great enough so as to lengthen the fall time of the address pulse, and to set the inductance of the first inductor L1 connected to the first path B1 for a rise of usual magnitude.

Also, in FIG. 12, descriptions are given about an example that includes the first diode D1 and the second diode D2. However, for example, if it is enough for the plasma display apparatus to make the characteristic of the rise time and the fall time of the LC resonance different, and is unnecessary to consider the backflow prevention, it is possible to configure the plasma display apparatus to directly connect the first switch SW11 and first inductor L1, and the second switch SW12 and second inductor L2, without providing the first diode D1 and the second diode D2.

Furthermore, in FIG. 12, descriptions are given about an example where the first diode D1 is connected and inserted between the first switch SW11 and the first inductor L1, and the second diode D2 is connected and inserted between the second switch SW12 and the second inductor L2, but the positions of the first switch SW11 and the first diode D1 and the positions of the second switch SW12 and the second diode D2 may be inverted. Even though the diodes D1, D2 are connected to the address electrode Aj side, and the switches SW11, SW12 are connected to the inductor L1, L2 side, since the electric connection relationship does not change, as long as the first switch SW11 and the first diode D1 are provided in the first branch path B1 in the address driver 21*a*, and the second switch SW12 and the second diode D2 are provided in the second branch path B2 in the address driver 21*a*, the arrangement orders are not limited.

In addition, in FIG. 12, each of the first diode D1 and the second diode D2 is provided in one bit of the address pulse output circuit 22*a*, and each of the first diode D1 and the second diode D2 may be provided in plural address pulse output circuit 22*a* in common. With this, it is possible to reduce footprint and cost.

Figure 14:
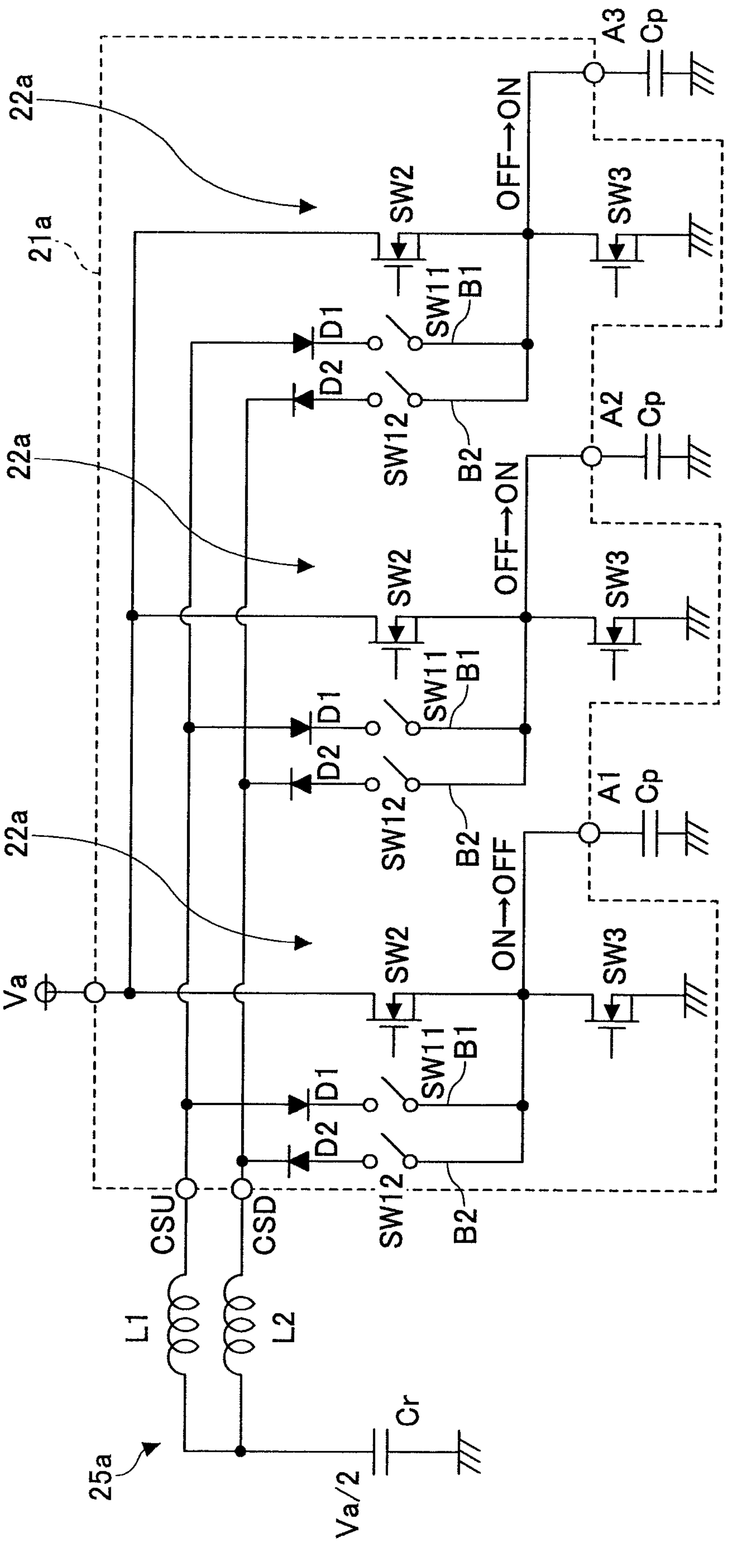
FIG. 14 is a drawing showing an example in which an address driver IC 21*a* includes plural one-bit address pulse output circuits 22*a*.

FIG. 14 is a drawing showing an example where plural one bit of the address pulse output circuits 22*a* are provided in the address driver 21*a*. In FIG. 14, three bits of address pulse output circuits 22*a* are provided in the address electrodes A1-A3. In the actual address driver 21*a*, hundreds of address pulse output circuits 22*a* are provided, but in FIG. 14, three bits of the address pulse output circuits 22*a* are shown because of space limitations.

Each of the address pulse output circuits 22*a* includes an output stage composed of the switch SW2 and switch SW3, and a first branch path B1 and a second branch path B2 connected in parallel to the address electrode Aj. In the first branch path B1, the first switch SW11 to switch the connection and disconnection of the address electrode Aj and the power recovery circuit 25*a*, and the first diode D1 a cathode of which is the address electrode Aj side. In a similar way, in the second branch path B2, the second switch SW12 to switch the connection and disconnection of the address electrode Aj, and the second diode D2 an anode of which is the address electrode Aj side. The anode of the first diode D1 of each of the address pulse output circuits 22*a* is connected in parallel to the charge sharing rising terminal CSU in common. Also, the cathode of the second diode D2 of each of the address pulse output circuits 22*a* is connected in parallel to the charge sharing trailing terminal CSD in common. With regard to the power recovery circuit 25*a*, a first inductor L1 is connected to the charge sharing rising terminal CSU, and a second inductor L2 is connected to the charge sharing trailing terminal CSD, and the first inductor L1 and the second inductor L2 are connected in parallel to the capacitor Cr for the power recovery in common.

In this way, the address pulse output circuits 22*a* provided in the bits in the address driver 21*a* are connected in parallel to the power recovery circuit 25*a* provided outside the address driver 21*a* by dividing the paths for address pulse rising and for address pulse trailing, by which the electric power used for the address driver 21*a* can be reduced. Also, since it is unnecessary to set the on-time control circuit 54 as the whole address driver 21*a*, it is unnecessary to control the complicated on-time of the first switch SW11 and the second switch SW12 and to improve the power efficiency, thereby simplifying the design.

Here, in FIG. 14, descriptions are given about an example where the diodes D1, D2 are provided in each bit of the address pulse output circuit 22*a*. However, for example, it is possible to provide one of the diodes D1 near the charge share rising terminal CSU and one of the diodes D2 near the charge share trailing terminal CSD in common. Since the number of the diodes D1, D2 can be considerably reduced, the cost can be reduced. Also, in this case, it is possible to provide the diodes D1, D2 outside the address driver 21*a* to be configured as a part of the power recovery circuit 25*a*. Moreover, it is possible to incorporate the power recovery circuit 25*a* into the address driver 21*a* as well as in the description in the first embodiment. Also, it is possible to change the arrangement of the switches SW11, SW12 in the first branch path B1 and the second branch path B2, and the diodes D1, D2, as described in FIG. 12.

Figure 15:
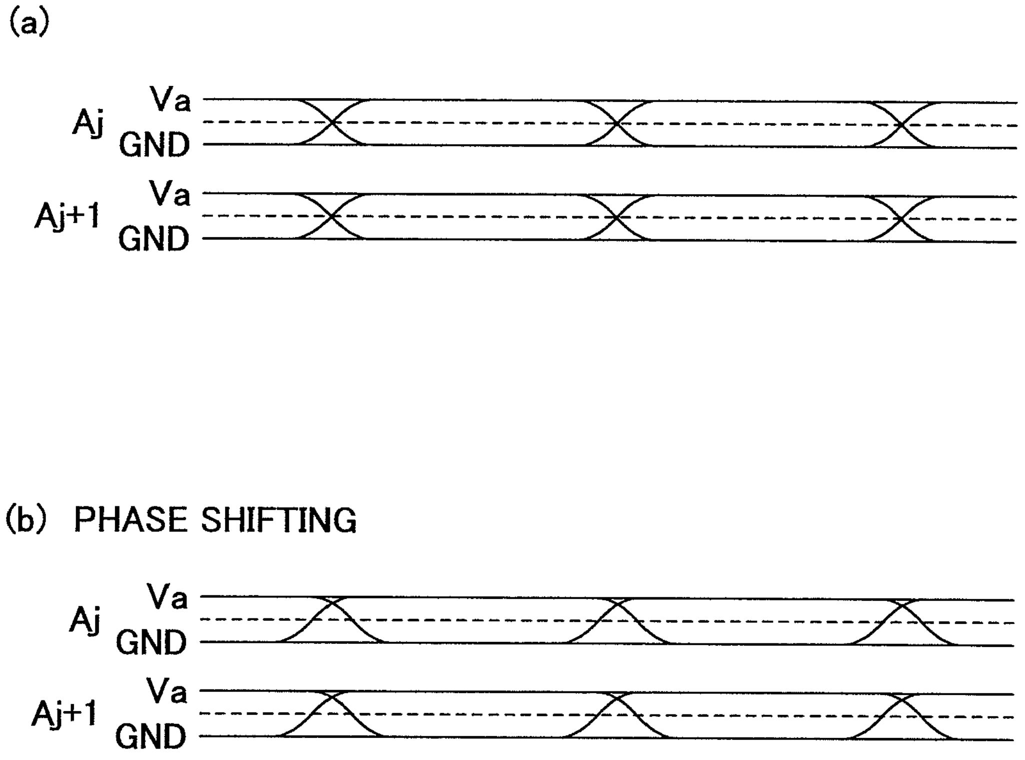
FIG. 15 is a drawing showing an example of a voltage waveform of an address pulse of the second embodiment, in which FIG. 15-(*a*) is a drawing showing an example of a voltage waveform with a coordinate phase about rising edge and trailing edge, and FIG. 15-(*b*) is a drawing showing an example of a voltage waveform with a different phase about the rising edge and the trailing edge.
Figure 16:
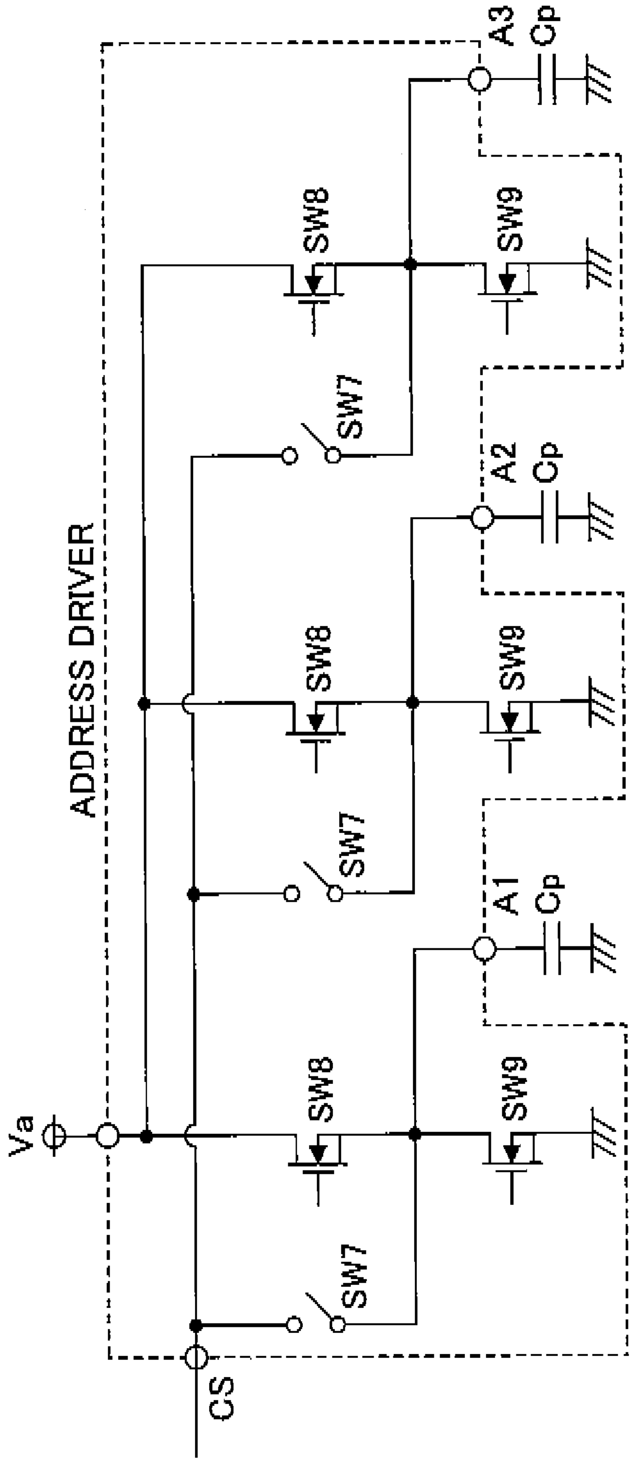
FIG.16 RELATED ART
FIG. 16 is a drawing showing an example of a conventional address driver.

FIG. 15 is a drawing showing an example of voltage waveforms of an address pulse of the plasma display apparatus of the second embodiment.

FIG. 15-(*a*) is a drawing showing an example of voltage waveforms in a case where rising and trailing of the address pulse has the same phase. In FIG. 15-(*a*), an example of the voltage waveform of the address pulse applied to adjacent bits of the address electrodes Aj, Aj+1 is shown by overlapping the rising edge and the trailing edge of the address pulse. In FIG. 15-(*a*), since the phases of the rising and trailing edges are common, in the rising and trailing edges, the address electrodes Aj to which the rising edge is applied and the address electrodes Aj to which the trailing edge is applied are simultaneously connected, the charge share is performed for twice the capacity.

On the other hand, FIG. 15-(*b*) is a drawing showing voltage waveforms in a case where the phases of the rising edge and the trailing edge of the address pulse are different. In FIG. 15-(*b*), by shifting the phases of the rising edge and trailing edge, it is possible to separately connect the address electrodes Aj of the rising edge timing and the address electrodes Aj of the trailing edge timing to the power recovery circuit 25*a*. With this, the charge sharing is separately performed between the address electrodes Aj to which the rising pulse is applied and the address electrodes Aj to which the trailing pulse is applied, and the capacity of each of the address electrodes Aj of the charge share object can be reduced, which can further improve the power efficiency.

In addition, regarding the number and position of the power recovery circuit 25*a*, descriptions in FIG. 9 through FIG. 11 of the first embodiment are applicable without modification. More specifically, the power recovery circuits 25*a* may be provided respectively corresponding to plural address drivers 21*a* one-to-one, and one power recovery circuit 25*a* may be provided corresponding to the plural address drivers 21*a*. In these cases, the plasma display apparatus may be configured in a manner such that two of the charge sharing rising edge terminals CSU and the charge share trailing edge terminals CSD are provided for each of the address drivers 21*a*, the first inductor L1 and the second inductor L2 of the power recovery circuit 25*a* are respectively connected to the charge share rising edge terminal CSU and the charge share railing edge terminal CSD, and the first inductor L1 and the second inductor L2 of the power recovery circuit 25*a* are connected to each line as the number of the power recovery circuits 25*a* increases.

Further, the present invention is not limited to these embodiments, but various variations and modifications may be made without departing from the scope of the present invention, and it is possible to combine the first embodiment and the second embodiment.

INDUSTRIAL APPLICABILITY

The present invention is applicable to a plasma display apparatus that displays images on a plasma display panel.

The invention claimed is:

1. A plasma display apparatus comprising:

a plasma display panel including a plurality of scanning electrodes extending in a first direction and a plurality of address electrodes extending in a second direction crossing the first direction;

an address driver to drive the address electrodes;

a power recovery circuit including an inductor and a capacitor;

a switch provided in the address driver to switch connection and disconnection between the address electrodes and the power recovery circuit;

an address driver output stage included in the address driver to supply one of a high-level voltage and a low-level voltage for the address electrodes; and a control unit to control on-time of the switches based on a switching conversion ratio between the high-level voltage and the low-level voltage, wherein the address driver includes a plurality of switches corresponding to the plurality of address electrodes;

the power recovery circuit is provided outside the address driver;

the plurality of switches are connected in parallel to the power recovery circuit; and the control unit shortens the on-time if the switching conversion ratio between the high-level voltage and low-level voltage is small, and lengthens the on-time if the switching conversion ratio between the high-level voltage and low-level voltage is large.

2. The plasma display apparatus as claimed in claim 1, wherein the power recovery corresponding to the address driver is provided.

3. The plasma display apparatus as claimed in claim 1, wherein the power recovery circuit is provided for a plurality of address drivers in common.

* * * * *